US012543786B2

(12) United States Patent
Fursa et al.

(10) Patent No.: US 12,543,786 B2
(45) Date of Patent: Feb. 10, 2026

(54) CARTRIDGE OF A STICK-SHAPED AEROSOL-GENERATING ARTICLE FOR USE WITH AN INDUCTIVELY HEATING AEROSOL-GENERATING DEVICE

(71) Applicant: Philip Morris Products S.A., Neuchatel (CH)

(72) Inventors: Oleg Fursa, Gempenach (CH); Fabien Zuchuat, Sion (CH); Vladimir Kiselev, Krasnodar (RU); Antoine Torbey Meouchi, Lausanne (CH); Timothy Goodenough, Lausanne (CH)

(73) Assignee: Philip Morris Products S.A., Neuchatel (CH)

( * ) Notice: Subject to any disclaimer, the term of this patent is extended or adjusted under 35 U.S.C. 154(b) by 448 days.

(21) Appl. No.: 18/254,193

(22) PCT Filed: Dec. 2, 2021

(86) PCT No.: PCT/EP2021/083954
§ 371 (c)(1),
(2) Date: May 24, 2023

(87) PCT Pub. No.: WO2022/117720
PCT Pub. Date: Jun. 9, 2022

(65) Prior Publication Data

US 2024/0032597 A1 Feb. 1, 2024

(30) Foreign Application Priority Data

Dec. 3, 2020 (EP) .................................... 20211611

(51) Int. Cl.
*A24F 40/42* (2020.01)
*A24F 40/10* (2020.01)
(Continued)

(52) U.S. Cl.
CPC .............. *A24F 40/42* (2020.01); *A24F 40/10* (2020.01); *A24F 40/44* (2020.01); *A24F 40/465* (2020.01); *A24F 40/485* (2020.01); *H05B 6/108* (2013.01)

(58) Field of Classification Search
None
See application file for complete search history.

(56) References Cited

U.S. PATENT DOCUMENTS

2011/0232654 A1 9/2011 Mass
2015/0245659 A1 9/2015 Depiano et al.
(Continued)

FOREIGN PATENT DOCUMENTS

EP 3 369 330 A2 9/2018
RU 2 673 611 C2 11/2018
(Continued)

OTHER PUBLICATIONS

Combined Russian Office Action and Search Report issued Apr. 10, 2025, in corresponding Russian Patent Application No. 2023117284/03(036898) (with English Translation), 14 pages.
(Continued)

*Primary Examiner* — Manley L Cummins, IV
(74) *Attorney, Agent, or Firm* — Oblon, McClelland, Maier & Neustadt, L.L.P.

(57) ABSTRACT

A cartridge for a stick-shaped aerosol-generating article is provided, the article being for an inductively heating aerosol-generating device, the cartridge including: a vaporization chamber at a distal end portion of the cartridge to vaporize aerosol-forming liquid; a reservoir chamber proximal the vaporization chamber to store the liquid; a liquid-conveying susceptor arrangement to convey the liquid from the reservoir chamber into the vaporization chamber and to be inductively heated with the device in order to vaporize the
(Continued)

liquid within the vaporization chamber; a vapor-conveying conduit providing a fluid communication for vaporized liquid from the vaporization chamber to a region proximal the reservoir chamber; a septum forming a common wall of the vaporization chamber and the reservoir chamber, the septum including a filling hole for filling the liquid into the reservoir chamber via the vaporization chamber; and a plug-shaped distal end cap forming a distal end wall of the vaporization chamber.

19 Claims, 6 Drawing Sheets

(51) Int. Cl.

| | |
|---|---|
| ***A24F 40/44*** | (2020.01) |
| ***A24F 40/465*** | (2020.01) |
| ***A24F 40/485*** | (2020.01) |
| ***H05B 6/10*** | (2006.01) |

(56) References Cited

U.S. PATENT DOCUMENTS

| | | | | |
|---|---|---|---|---|
| 2015/0245669 | A1 | 9/2015 | Cadieux et al. | |
| 2016/0150825 | A1* | 6/2016 | Mironov | H05B 6/105 219/634 |
| 2016/0150828 | A1 | 6/2016 | Goldstein et al. | |
| 2017/0135397 | A1* | 5/2017 | Buehler | A61M 15/0036 |
| 2018/0020722 | A1 | 1/2018 | Davis et al. | |
| 2018/0360120 | A1* | 12/2018 | Huang | A24F 40/46 |
| 2019/0046745 | A1 | 2/2019 | Nettenstrom et al. | |
| 2019/0075845 | A1* | 3/2019 | Malgat | A24D 1/20 |
| 2019/0104763 | A1 | 4/2019 | Tucker et al. | |
| 2019/0208812 | A1 | 7/2019 | Sebastian et al. | |
| 2019/0208813 | A1* | 7/2019 | Rojo-Calderon | A24D 1/20 |
| 2020/0120984 | A1 | 4/2020 | Rogan | |
| 2021/0204604 | A1* | 7/2021 | Mironov | H05B 6/105 |
| 2021/0259319 | A1* | 8/2021 | Rogan | A24F 40/465 |
| 2022/0202090 | A1* | 6/2022 | Moloney | A24F 40/42 |

FOREIGN PATENT DOCUMENTS

| | | | |
|---|---|---|---|
| RU | 2 711 875 | C2 | 1/2020 |
| RU | 2 721 092 | C2 | 5/2020 |
| WO | WO 2015/177294 | A1 | 11/2015 |
| WO | WO 2019/224078 | A1 | 11/2019 |
| WO | WO 2019/224380 | A1 | 11/2019 |
| WO | WO 2020/188244 | A1 | 9/2020 |

OTHER PUBLICATIONS

International Search Report & Written Opinion issued Apr. 7, 2022 in PCT/EP2021/083954 filed on Dec. 2, 2021, 13 pages.

* cited by examiner

CARTRIDGE OF A STICK-SHAPED AEROSOL-GENERATING ARTICLE FOR USE WITH AN INDUCTIVELY HEATING AEROSOL-GENERATING DEVICE

The present disclosure relates to a cartridge for a stick-shaped aerosol-generating article which is configured for use with an inductively heating aerosol-generating device. The disclosure further relates to such an article as well as to an aerosol-generating system comprising such an aerosol-generating article and such an aerosol-generating device.

Systems for generating inhalable aerosols by inductively heating aerosol-forming substrates, which are capable of releasing volatile compounds upon heating, are generally known from prior art. For heating the substrate, it may be arranged or brought in thermal proximity or direct physical contact with a susceptor which is inductively heatable under the influence of an alternating magnetic field. The susceptor and the substrate may be assembled together in an aerosol-forming article which is configured to be received in a corresponding cavity of an aerosol-generating device. The device comprises an induction source for generating an alternating magnetic field within the cavity in order to inductively heat the susceptor and thus the substrate, when the article is received in the cavity. The article may further comprise a mouthpiece which a user may puff on in order to cause airflow through the article from the substrate towards the mouthpiece. Hence, when a user takes a puff in operation of the device, volatile compounds released from the heated substrate are entrained in the airflow, where they cool and condense to form an aerosol which exits the article at the mouthpiece. Together, the aerosol-generating article and the aerosol-generating device form an aerosol-generating system, in which the article typically is a disposable consumable, whereas the device typically is reused with other articles.

According to a specific design of such an aerosol-generating system, the article may have a cylindrical stick-shape resembling the shape of conventional cigarettes, in which the susceptor and the substrate are arranged at a distal end portion, for example, in a distal substrate plug, and the mouthpiece is arranged at a proximal end portion of the article. Aerosol-generating articles having such visual and haptic similarities to conventional cigarettes are mainly known for articles comprising solid aerosol-forming substrates, in particular tobacco-containing solid aerosol-forming substrates. Systems using other substrates, such as so-called e-liquids, typically use a different design of the entire system for technical reasons. However, it would be desirable to have a similar, yet simple design for an article employing other aerosol-generating substrates, in particular liquid substrates, in order to enlarge the range of products compatible with the aforementioned devices which are configured to receive and inductively heat stick-shaped articles.

According to the present invention, there is provided a cartridge of a stick-shaped aerosol-generating article for use with an inductively heating aerosol-generating device, that is, a cartridge for a stick-shaped aerosol-generating article, i.e. for use in a stick-shaped aerosol-generating article, wherein the article is configured for use with an inductively heating aerosol-generating device. The cartridge comprises a vaporization chamber at a distal end portion of the cartridge for vaporizing aerosol-forming liquid therein as well as a reservoir chamber proximal the vaporization chamber for storing aerosol-forming liquid. The cartridge further comprises a liquid-conveying susceptor arrangement configured and arranged to convey aerosol-forming liquid from the reservoir chamber into the vaporization chamber and to be inductively heated in use with the device in order to vaporize aerosol-forming liquid within the vaporization chamber. The cartridge also comprises a vapor-conveying conduit providing a fluid communication for vaporized aerosol-forming liquid from the vaporization chamber to a region proximal the reservoir chamber. In addition, the cartridge comprises a distal end cap forming at least a distal end wall member of the vaporization chamber, wherein the distal end cap is non-integral with any wall member of the reservoir chamber.

According to the invention, it has been found that the above described design of the cartridge proves advantageous with regard a simple and cost-effective manufacturing of a stick-shaped aerosol-generating article which can be readily used with inductively heating aerosol-generating devices already contemplated for solid substrate consumables in order to generate aerosols also from liquid substrates. As will be described in more detail further below, such an article may be easily realized, for example, by equipping the cartridge with a cylindrical mouthpiece adjacent the reservoir chamber and subsequently wrapping of a wrapper around at least a portion of the cartridge and the mouthpiece in order to keep the mouthpiece and the cartridge together. This results in an article having a stick-like outer shape which is similar or equal to already contemplated articles containing solid substrates and which, thus, is compatible for use with already contemplated aerosol-generating devices. Due to this, these devices may be universally used with different kinds of articles in order to generate aerosols from different kinds of aerosol-forming substrates, in particular solid and liquid substrates.

The arrangement of the vaporization chamber at a distal end portion of the cartridge and thus at a distal end portion of the article including such a cartridge corresponds to the arrangement of the solid substrate and the susceptor in the distal substrate plug of already contemplated articles. Advantageously, this ensures that in use with an inductively heating aerosol-generating device the vaporization chamber is placed at about the same position within the cavity of the device as the distal substrate plug of already contemplated articles, that is, at the place where the alternating magnetic field is generated within the cavity. Hence, an article comprising such a cartridge is not only receivable, but also readily heatable by those devices which already exist for inductively heatable consumables containing solid aerosol-forming substrates.

Using a distal end cap forming at least a distal end wall member of the vaporization chamber advantageously facilitates the manufacturing of the cartridge. In particular, it enables an open access implementation of those components which are arranged within the interior of the cartridge, such as the liquid-conveying susceptor arrangement, before the interior of the cartridge is finally closed by the distal end cap.

Preferably, the vaporization chamber may be fully enclosed by wall members. Due to this, the vaporization chamber is substantially sealed apart from a possible one air inlet and the fluid communication from the vaporization chamber to the region proximal the reservoir chamber. As a result, the cartridge is substantially leak-proof which proves advantageous with regard to the shelf life of the article the cartridge may be part of. In particular, if aerosol-forming liquid eventually leaks from the reservoir chamber into the vaporization chamber, for example, during the transport from productions to sales, the liquid will be still retained in the vaporization chamber. Even more, liquid leaked into the vaporization chamber is not wasted but still contributes to the aerosol generation since it will be still evaporated during a next heating process. To this extent, the term "chamber" as used herein already implies a substantially sealed chamber. Accordingly, the reservoir chamber is also substantially sealed, apart from the fluid communication between the reservoir chamber and the vaporization chamber via the liquid-conveying susceptor arrangement.

To prevent a user from getting burned when touching an article including a cartridge according to the present invention shortly after a heating process, the distal end cap preferably is inductively non-heatable. In addition, this prevents energy provided by the alternating magnetic field from being unnecessarily dissipated in the distal end cap. As a result, energy dissipation in the liquid-conveying susceptor arrangement may be enhanced. Accordingly, the distal end cap preferably is made of a material that is inductively non-heatable, i.e. which is electrically non-conductive and non-magnetic (non-ferromagnetic or non-ferromagnetic). The distal end cap may be made of plastic or silicone. Such materials provide proper sealing properties and also are cheap which is of particular interest with regard to the fact that the cartridge preferably is used in an aerosol-generating article configured for single use only. Preferably, the plastic is a thermoplastic, such as PEEK (polyether ether ketone), in order to provide good thermal stability. The distal end cap may be manufactured by injection molding. That is, the distal end cap may be an injection-molded distal end cap.

Preferably, any wall member of the vaporization chamber is inductively non-heatable, that is, made of a material that is inductively non-heatable. Likewise, any wall member of the vaporization chamber is also inductively non-heatable.

The distal end cap preferably defines a most distal end of the cartridge. That is, there are no other components which protrude beyond the distal end cap in the distal direction. In particular, the distal end of the cartridge may be free of any connector or coupling means, such as for coupling an aerosol-generating article including such a cartridge to an aerosol-generating device. For example, where the stick-shaped cartridge has a cylindrical shape, the cartridge may have a flat distal face at its most distal end.

In order to allow air entering the vaporization chamber for the aerosol formation, the vaporization chamber may comprise at least one air inlet. Preferably, the at least one air inlet is formed in the distal end cap. As an example, the at least one air inlet may comprise an air vent hole through the distal end cap. As another example, the at least one air inlet may comprise an air vent groove formed in a surface of the distal end cap facing a wall member of the vaporization chamber other than the distal end cap, in particular a circumferential outer side wall member of the vaporization chamber.

According to one example, the distal end cap may be plug-shaped. The plug-shaped distal end cap may comprise a plug body at least a portion of which is inserted into a circumferential outer side wall member of the vaporization chamber. The plug body may also be fully inserted into the circumferential outer side wall member of the vaporization chamber. In general, the plug body may have a shape corresponding to the shape of the interior of the vaporization chamber, in particular a cross-sectional shape corresponding to the cross-sectional shape of the interior of the vaporization chamber. As used herein, the term "cross-sectional shape" refers to the shape of the plug body or the interior of the vaporization chamber as seen in a cross-section perpendicular to a longitudinal axis of the cartridge. Preferably, the plug body is substantially cylindrical or frusto-conical. The plug body may comprise a circumferential collar providing a sealing fit of the distal end cap in the cartridge, in particular against the circumferential outer side wall member of the reservoir chamber. That is, the circumferential collar is not inserted into the circumferential outer side wall of the vaporization chamber.

The plug-shaped distal end cap may also comprise a cover plate. In order to fully close the vaporization chamber at the distal end of the cartridge, the cover plate may be either inserted into the circumferential outer side wall of the vaporization chamber or may extend radially outwards beyond the cross-sectional shape of the interior of the vaporization chamber. In the latter case, the cover plate may further comprise a protruding collar abutting a distal front end of a circumferential outer side wall member of the vaporization chamber. This may also hold for the plug-shaped distal end cap in general, that is, the plug-shaped distal end cap may comprise a protruding collar abutting a distal front end of a circumferential outer side wall member of the vaporization chamber.

The plug-shaped distal end cap may further comprise, preferably in addition to the cover plate, an insertion portion at least partially inserted in a circumferential outer side wall member of the vaporization chamber. The insertion portion may comprise an insertion ring or an insertion tube or an insertion cylinder or an insertion hollow-cylinder or a plurality of insertion ring segments or a plurality of insertion pins or a plurality of insertion fins. The insertion portion at least partially may extend, in particular from the cover plate (if present), to a septum forming a common wall member of the vaporization chamber and the reservoir chamber. This may also hold for the plug-shaped distal end cap in general, that is, the plug-shaped distal end cap at least partially may extend, in particular from a cover plate (if present), to a septum forming a common wall member of the vaporization chamber and the reservoir chamber. In particular, the plug-shaped distal end cap may comprise at least one, in particular at least two, preferably two, three or four supporting legs. The at least one supporting leg may extend, preferably from a distal end of the cartridge, in particular from a cover plate (if present), to a septum forming a common wall member of the vaporization chamber and the reservoir chamber. Due to this, the plug-shaped distal end cap is fixed in position at least in a proximal direction against the septum. Having at least two, in particular two, three or four supporting legs advantageously provides a uniform support of the distal end cap against the septum. Details of the septum will be described further below. In particular, the at least one supporting leg may extend along an inner surface of a circumferential outer side wall member of the vaporization chamber. Due to this, the aerosol formation processes in the interior of the vaporization chamber is only slightly affected.

In addition, the plug-shaped distal end cap may comprise at a proximal end at least one plug member sealingly closing a filling hole in the septum which may be used for filling aerosol-forming liquid into the reservoir chamber via the vaporization chamber. Advantageously, this configuration enables to seal the filling hole and to close the distal end of the vaporization chamber in a single step by mounting the plug-shaped distal end cap to the other parts of the cartridge. Preferably, the plug member is arranged at a proximal end of the insertion portion (if present), in particular at a proximal end of the at least one supporting leg (if present). The plug member may be made of the same material, in particular integral with other parts of the plug-shaped distal end cap.

According to another example, the distal end cap may be cup-shaped. In particular, the cup-shaped distal end cap may comprise a bottom portion forming the distal end wall member of the vaporization chamber and a sleeve portion (side wall of the cup shape) forming a circumferential outer side wall member of the vaporization chamber. In this configuration the vaporization chamber is substantially fully formed by the distal end cap, apart from a proximal end wall member of the vaporization chamber. The proximal end wall member of the vaporization chamber preferably is formed by the aforementioned septum. Having a circumferential outer side wall member and a distal end wall member of the vaporization chamber integrally formed by the cup-shaped distal end cap, that is, by a one-piece component, advantageously reduces the number of components to be assembled and thus simplifies the construction and the assembling of the cartridges. In addition, this configuration provides a maximum open access for implementing components within the interior of the cartridge, such as the liquid-conveying susceptor arrangement.

In general, the distal end cap may be mounted in the cartridge by press-fit or by snap-fit or by welding or by an adhesive bond. A press-fit or by a snap-fit enables a particularly simple assembling of the distal end cap. Welding or adhesive bonds ensure a good sealing of the joint between the distal end cap and the corresponding connection counterpart. Where the distal end cap is plug-shaped or comprises a cover plate (with or without insertion portion), the distal end cap may be mounted (preferably by any of the aforementioned means) to a circumferential outer side wall member of the vaporization chamber (as the corresponding connection counterpart), in particular to a distal end of a circumferential outer side wall member of the vaporization chamber. Where the distal end cap is cup-shaped, the distal end cap may be mounted (preferably by any of the aforementioned means) to a septum of the cartridge (as the corresponding connection counterpart), wherein the septum forms a common wall member of the vaporization chamber and the reservoir chamber, in particular a proximal end wall member of the vaporization chamber.

Similar to the distal end cap, the cartridge may further comprise a proximal end cap forming at least a proximal wall member of the reservoir chamber. Using a proximal end cap advantageously facilitates the manufacturing of the cartridge, in particular as it may allow for manufacturing other parts of the cartridge by extrusion, such as the vapor-conveying conduit or an outer circumferential side wall of the reservoir chamber and the vaporization chamber.

The proximal end cap may comprise a through hole, which a proximal end portion of the vapor-conveying conduit passes through or is supported in or ends integrally in. This proves advantageous with regard to a stable fixation of the vapor-conveying conduit in the cartridge as well as with regard to a proper sealing fit between the vapor-conveying conduit and the proximal end cap. A proper sealing fit is in particular important where the vapor-conveying conduit also forms a wall member (an inner wall member) of the reservoir chamber. For example, the vapor-conveying conduit may be formed by an inner tube of the cartridge, which at its inside provides the fluid communication from the vaporization chamber to a region proximal the reservoir chamber and at its outside defines an inner side wall member of the reservoir chamber. In this configuration, the proximal end cap and the vapor-conveying conduit both form wall members of the reservoir chamber, for which reason the joint between both components must be sealed to avoid leakage of aerosol-forming liquid. A particularly proper sealing fit is automatically given where the proximal end of the vapor-conveying conduit ends integrally in the through hole, that is, where at least a portion of the vapor-conveying conduit, preferably the entire vapor-conveying conduit is integrally formed with the proximal end cap.

As stated above, the proximal end cap forms at least a proximal wall member of the reservoir chamber. In particular, the proximal end cap may form only a proximal wall member of the reservoir chamber. Accordingly, the proximal end cap may be non-integral with (separate from) any other wall member of the reservoir chamber, such as a circumferential outer side wall member or an inner side wall member of the reservoir chamber. Likewise, the proximal end cap may be non-integral with (separate from) the vapor-conveying conduit, in particular where the vapor-conveying conduit forms a wall member (an inner wall member) of the reservoir chamber. That is, the proximal end cap may be separate from any wall member of the reservoir chamber other than the proximal end wall member. Vice versa, it is possible that in addition to the proximal wall member of the reservoir chamber the proximal end cap also forms at least one of a circumferential outer side wall member or an inner side wall member of the reservoir chamber. In this configuration, the proximal end cap may correspond to a one-piece main body described further below. Also, the proximal end cap may be non-integral with (separate from) any wall member of the vaporization chamber.

The proximal end cap may comprise a distal recess forming a distal portion of the through hole which the proximal end portion of the vapor-conveying conduit is supported in. An inner cross-section of the distal recess may be larger than an inner cross-section of a proximal portion of the through hole other than the distal portion. Due to this, the distal recess forms an abutment for the proximal end portion of the vapor-conveying conduit in order to fix the position of the vapor-conveying conduit at least in the proximal direction. Furthermore, the inner cross-section of the proximal portion of the through hole may correspond to an inner cross-section of the vapor-conveying conduit. As a result, the airflow passage through the vapor-conveying conduit smoothly continues through the proximal portion of the through hole, which is advantageous with regard to an undisturbed airflow/aerosol flow through the cartridge. Alternatively, the inner cross-section of the proximal portion of the through hole may be larger or smaller than an inner cross-section of the vapor-conveying conduit. As a result, the airflow passage through the cartridge is non-smooth which may cause the airflow/aerosol flow being turbulent. Turbulent airflow/aerosol flow may be desired in order to promote aerosol formation.

The proximal end cap may comprise a distal insertion socket protruding into the reservoir chamber, wherein the distal insertion socket forms a distal portion of the through hole which a proximal end portion of the vapor-conveying conduit is supported in. That is, the distal insertion socket may be considered as a protrusion extending into the reservoir chamber which comprises a recess that forms a distal portion of the through hole. An inner cross-section of the distal insertion socket may be larger than an inner cross-section of a proximal portion of the through hole other than the distal portion. Due to this, as described above with regard to the distal recess, the distal insertion socket forms an abutment for the proximal end portion of the vapor-conveying conduit in order to fix the position of the vapor-conveying conduit at least in the proximal direction. In order to provide a substantially smooth airflow passage through the cartridge, the inner cross-section of the proximal portion of the through hole may correspond to an inner cross-section of the vapor-conveying conduit. Alternatively, the inner cross-section of the proximal portion of the through hole may be larger or smaller than an inner cross-section of the vapor-conveying conduit, in order to promote a turbulent airflow/aerosol flow.

The proximal end cap may comprise at least one filling hole for filling aerosol-forming liquid into the reservoir chamber. A filling hole in the proximal end cap provides a convenient access to the interior of the relevant chamber in order to be filled. For closing the at least one filling hole upon having filled the reservoir chamber with aerosol-forming liquid, the cartridge may comprise a proximal plug member sealingly closing the at least one filling hole of the proximal end cap. In case the proximal end cap comprises more than one filling hole, the proximal plug member preferably is configured for closing each of the filling holes. Alternatively, the cartridge may comprise a separate proximal plug member for each of the filling holes. In order to have a substantially flat proximal face at the proximal end of the cartridge, the proximal end cap may comprise a proximal recess which the proximal plug member is received in. The one or more filling holes may be arranged adjacent the through hole of the proximal end cap. For example, the proximal end cap may comprise two filling holes being laterally arranged at opposite sides of the through hole. In this configuration, the proximal plug member may comprise a disc with protrusions sealingly fitting into the filling holes. To enable aerosol to freely escape from the cartridge into the proximal direction, the proximal plug member may comprise a through hole congruent with the through hole of the proximal end cap. Preferably, a cross-section of the through hole of the proximal plug member corresponds to an inner cross-section of the vapor-conveying conduit in order to provide a smooth airflow passage. Alternatively, a cross-section of the through hole of the proximal plug member may be larger or smaller than an inner cross-section of the vapor-conveying conduit in order to promote a turbulent airflow/aerosol flow.

According to one example, the proximal end cap may be plug-shaped. The plug-shaped proximal end cap may comprise a plug body at least a portion inserted into a circumferential outer side wall member of the reservoir chamber. The plug body may also be fully inserted into the circumferential outer side wall of the reservoir chamber. In general, the plug body may have a shape, in particular a cross-sectional shape corresponding to the shape of the interior of the reservoir chamber, in particular a corresponding to the cross-sectional shape of the interior of the reservoir chamber. As used herein in, the term "cross-sectional shape" refers to the shape of the plug body or the interior of the reservoir chamber as seen in a cross-section perpendicular to a longitudinal axis of the cartridge. Preferably, the plug body is substantially cylindrical or frusto-conical. The plug body may comprise a circumferential collar providing a sealing fit of the proximal end cap in the cartridge, in particular against the circumferential outer side wall member of the reservoir chamber. That is, the circumferential color is not inserted into the circumferential outer side wall member of the reservoir chamber.

The plug-shaped proximal end cap may also comprise a cover plate. In order to fully close the reservoir chamber at the proximal end of the cartridge, the cover plate may be either inserted into the circumferential outer side wall of the reservoir chamber or may extend radially outwards beyond the cross-sectional shape of the interior of the reservoir chamber. In the latter case, the cover plate may further comprise a protruding color abutting a proximal front end of a circumferential outer side wall member of the reservoir chamber. This may also hold for the plug-shaped proximal end cap in general, that is, the plug-shaped proximal end cap may comprise a protruding collar abutting a proximal front end of a circumferential outer side wall member of the reservoir chamber.

The plug-shaped proximal end cap may further comprise, preferably in addition to the cover plate, an insertion portion at least partially inserted in a circumferential outer side wall member of the reservoir chamber. The insertion portion may comprise an insertion ring or an insertion tube or an insertion cylinder or an insertion hollow-cylinder or a plurality of insertion ring segments or a plurality of insertion pins or a plurality of insertion fins. The insertion portion at least partially may extend, in particular from the cover plate (if present), to a septum forming a common wall member of the vaporization chamber and the reservoir chamber. This may also hold for the plug-shaped proximal end cap in general, that is, the plug-shaped proximal end cap at least partially may extend, in particular from a cover plate (if present), to a septum forming a common wall member of the vaporization chamber and the reservoir chamber. In particular, the plug-shaped proximal end cap may comprise at least one, in particular at least two, preferably two, three or four supporting legs. The at least one supporting leg may extend, preferably from a proximal end of the cartridge, in particular from a cover plate (if present), to a septum forming a common wall member of the vaporization chamber and the reservoir chamber. Due to this, the plug-shaped proximal end cap is fixed in position at least in a distal direction against the septum. Having at least two, in particular two, three or four supporting legs advantageously provides a uniform support of the proximal end cap against the septum. Details of the septum will be described further below. In particular, the at least one supporting leg may extend along an inner surface of a circumferential outer side wall member of the reservoir chamber.

According to another example, the proximal end cap may be cup-shaped. In particular, the cup-shaped proximal end cap may comprise a bottom portion forming the proximal end wall member of the reservoir chamber and a sleeve portion (side wall of the cup-shaped) forming a circumferential outer side wall member of the reservoir chamber. In this configuration the reservoir chamber is substantially fully formed by the proximal end cap, apart from a distal end wall member of the vaporization chamber. The distal end wall member preferably is formed by the aforementioned septum. Having a circumferential outer side wall member and a proximal end wall member of the reservoir chamber integrally formed by a cup-shaped proximal end cap, that is, by a one-piece component, advantageously reduces the number of components to be assembled and thus simplifies the construction and the assembling of the cartridges.

In general, yet in particular where the proximal end cap is separate from (non-integral with) any other wall member of the reservoir chamber, the proximal end cap may be mounted in the cartridge by press-fit or by snap-fit or by welding or by an adhesive bond. A press-fit or by a snap-fit enables a particularly simple assembling of the proximal end cap. Welding or adhesive bonds ensure a good sealing of the joint between the proximal end cap and the corresponding connection counterpart. Where the proximal end cap is plug-shaped or comprises a cover plate (with or without insertion portion), the proximal end cap may be mounted (preferably by any of the aforementioned means) to a circumferential outer side wall member of the reservoir chamber (as the corresponding connection counterpart), in particular to a distal end of a circumferential outer side wall member of the reservoir chamber. Where the proximal end cap is cup-shaped, the proximal end cap may be mounted (preferably by any of the aforementioned means) to a septum of the cartridge (as the corresponding connection counterpart), wherein the septum forms a common wall member of the vaporization chamber and the reservoir chamber, in particular a distal end wall member of the reservoir chamber.

Preferably, the proximal end cap is made of a material that is inductively non-heatable, i.e. which is electrically non-conductive and non-magnetic (non-ferromagnetic or non-ferromagnetic). The proximal end cap may be made of plastic or silicone. Such materials provide proper sealing properties and also are cheap, which is of particular interest with regard to the fact that the cartridge preferably is used in an aerosol-generating article configured for single use only. Preferably, the plastic is a thermoplastic, such as PEEK (polyether ether ketone), in order to provide good thermal stability. The proximal end cap may be manufactured by injection molding. That is, the proximal end cap may be an injection-molded proximal end cap.

The proximal end cap preferably defines a most proximal end of the cartridge. That is, there are no other components which protrude beyond the proximal end cap in the proximal direction. In particular, the proximal end of the cartridge may be free of any connector or coupling means, such as for coupling a mouthpiece to the cartridge. For example, where the stick-shaped cartridge has a cylindrical shape, the cartridge may have a flat proximal face at its most proximal end.

The cartridge may comprise a septum forming a common wall member of the vaporization chamber and the reservoir chamber. Using a septum forming a common wall member of the vaporization chamber and the reservoir chamber advantageously reduces the number of components to be assembled and thus simplifies the construction and the assembling of the cartridges. Preferably, the septum is non-integral (separate from) any other wall member of the vaporization chamber and the reservoir chamber. Advantageously, this facilitates the manufacturing of the cartridge, in particular as it may allow for manufacturing other parts of the cartridge by extrusion, such as the vapor-conveying conduit or an outer circumferential side wall of the reservoir chamber and the vaporization chamber.

As herein, the term "septum" refers to a separation wall separating the vaporization chamber from the reservoir chamber, that is, separation a portion of the interior of the cartridge into the vaporization chamber and the reservoir chamber.

To prevent energy provided by the alternating magnetic field from being unnecessarily dissipated in the septum, the septum preferably is inductively non-heatable. That is, the septum preferably is made of a material that is inductively non-heatable, i.e. which is electrically non-conductive and non-magnetic (non-ferromagnetic or non-ferromagnetic). In addition, this may help to reduce the risk that a user gets burned when touching an article including a cartridge according to the present invention shortly after a heating process.

The septum may be made of plastic or silicone. Such materials provide proper sealing properties and also are cheap which is of particular interest with regard to the fact that the cartridge preferably is used in an aerosol-generating article configured for single use only. Preferably, the plastic is a thermoplastic, such as PEEK (polyether ether ketone), in order to provide good thermal stability. The septum may be manufactured by injection molding. That is, the septum may be an injection-molded septum.

Preferably, the septum comprises a through hole which the vapor-conveying conduit passes through or is supported in at a distal end portion.

The septum may comprise a proximal recess forming a proximal portion of the through hole which the vapor-conveying conduit is supported in at a distal end portion. An inner cross-section of the proximal recess may be larger than an inner cross-section of a distal portion of the through hole other than the proximal portion. Due to this, the proximal recess forms an abutment for the distal end portion of the vapor-conveying conduit in order to fix the position of the vapor-conveying conduit at least in the distal direction. Furthermore, the inner cross-section of the distal portion of the through hole may correspond to an inner cross-section of the vapor-conveying conduit. As a result, the airflow passage entering the vapor-conveying conduit via the through hole of the septum may smoothly continue from the vaporization chamber into the vapor-conveying conduit. This is advantageous with regard to an undisturbed airflow/aerosol flow through the cartridge. Alternatively, the inner cross-section of the distal portion of the through hole may be larger or smaller than an inner cross-section of the vapor-conveying conduit. As a result, the airflow passage through the cartridge is non-smooth which may cause the airflow/aerosol flow being turbulent. Turbulent airflow/aerosol flow may be desired in order to promote aerosol formation.

The septum may comprise a proximal insertion socket protruding into the reservoir chamber, wherein the proximal insertion socket forms a proximal portion of the through hole which a distal end portion of the vapor-conveying conduit is supported in. That is, the proximal insertion socket may be considered as a protrusion extending into the reservoir chamber which comprises a recess that forms a proximal portion of the through hole. An inner cross-section of the proximal insertion socket may be larger than an inner cross-section of a distal portion of the through hole other than the proximal portion. Due to this, as described above with regard to the proximal recess, the proximal insertion socket forms an abutment for the distal end portion of the vapor-conveying conduit in order to fix the position of the vapor-conveying conduit at least in the distal direction. In order to provide a substantially smooth airflow passage through the cartridge, the inner cross-section of the distal portion of the through hole may correspond to an inner cross-section of the vapor-conveying conduit. Alternatively, the inner cross-section of the distal portion of the through hole may be larger or smaller than an inner cross-section of the vapor-conveying conduit, in order to promote a turbulent airflow/aerosol flow.

Preferably, the liquid-conveying susceptor arrangement passes through the septum. For this, the septum may comprise one or more feedthrough openings the liquid-conveying susceptor arrangement passes through. Preferably, the liquid-conveying susceptor arrangement is fixedly hold by the septum. Advantageously, the liquid-conveying susceptor arrangement is fixed in the septum prior to assembling the cartridge in order to facilitate the assembly.

In order prevent undesired leakage of aerosol-forming liquid, the cartridge may comprise at least one sealing ring for each of one the one or more feedthrough openings of the septum arranged in or at the respective feedthrough opening. In particular, the at least one sealing ring may be overmolded around a portion of the liquid-conveying susceptor arrangement. Advantageously, this provides a particularly good sealing and facilitates the assembly of the cartridge. Preferably, the liquid-conveying susceptor arrangement is overmolded with sealing ring prior to assembling the cartridge. Preferably, the at least one sealing ring is made of plastic or silicone. Such materials provide proper sealing properties and also are cheap which is of particular interest with regard to the fact that the cartridge preferably is used in an aerosol-generating article configured for single use only. Preferably, the plastic is a thermoplastic, such as PEEK (polyether ether ketone), in order to provide good thermal stability.

The septum may comprise at least one filling hole for filling aerosol-forming liquid into the reservoir chamber via the vaporization chamber. The one or more filling holes may be arranged adjacent a through hole of the septum which the vapor-conveying conduit passes through or is supported in at a distal end portion. For example, the septum may comprise two filling holes being laterally arranged at opposite sides of the through hole. For closing the at least one filling hole upon having filled the reservoir chamber with aerosol-forming liquid, the cartridge may comprise a distal plug member sealingly closing the at least one filling hole of the septum. In case the septum comprises more than one filling hole, the distal plug member preferably is configured for closing each of the filling holes. Alternatively, the cartridge may comprise a separate distal plug member for each of the filling holes. Preferably, the distal plug member is attached to, in particular is integral part of a distal end cap which forms at least a distal end wall member of the vaporization chamber. Details of the distal end cap have been described further above. Alternatively, the distal plug member may be non-integral with any wall member of the vaporization chamber. Likewise, the distal plug member may be non-integral with any wall member of the reservoir chamber. Like the septum itself, the distal plug member may be made of plastic or silicone, in particular PEEK (polyether ether ketone), in order to provide good thermal stability.

The septum may be mounted in the cartridge by press-fit or by snap-fit or by welding or by an adhesive bond. A press-fit or by a snap-fit enables a particularly simple assembling of the septum. Welding or adhesive bonds ensure a good sealing of the joint between the septum and the corresponding connection counterpart. Preferably, the septum is mounted in a cartridge sleeve forming at least one a circumferential outer side wall member of the vaporization chamber (or at least a portion thereof) and a circumferential outer side wall member of the reservoir chamber (or at least a portion thereof). Likewise, the septum may be mounted in an outer sleeve portion of a one-piece main body of the cartridge which forms at least a circumferential outer side wall member of the reservoir chamber and preferably also a circumferential outer side wall member of the vaporization chamber. Details of the cartridge sleeve and the one-piece main body will be described further below. It is also possible that the cartridge comprises a cup-shaped distal end cap and a cup-shaped proximal end cap, wherein the cup-shaped distal end cap forms a distal end wall and a circumferential outer side wall of the vaporization chamber and the cup-shaped proximal end cap forms a proximal end wall and a circumferential outer side wall of the reservoir chamber. In this configuration, each of the cup-shaped end caps is attached to the septum such that the septum holds the cup-shaped distal end cap and the cup-shaped proximal end cap together and forms a distal end wall of the reservoir chamber and a proximal end wall of the vaporization chamber. Details of t the cup-shaped distal end cap and the cup-shaped proximal end cap have already been described further above.

The septum may comprise a circumferential collar providing a sealing fit of the septum in the cartridge. In particular, the septum may comprise a circumferential collar providing a sealing fit of the septum against a cartridge sleeve forming at least one of a circumferential wall member of the vaporization chamber and a circumferential wall member of the reservoir chamber, or against an outer sleeve portion, or against at least one of a cup-shaped distal end cap and a cup-shaped proximal end cap, as described above.

The cartridge may comprise a cartridge sleeve. The cartridge sleeve may form at least one of a circumferential outer side wall member of the vaporization chamber (or at least a portion thereof) and a circumferential outer side wall member of the reservoir chamber (or at least a portion thereof). In particular, the cartridge sleeve may extend along the entire axial extension of the reservoir chamber and the vaporization chamber, that is, preferably along the entire axial extension of the cartridge.

The cartridge sleeve may have an inner cross-section and an outer cross-section of any shape. In particular, the cartridge sleeve may have a circular, an ellipsoidal, an oval, a triangular, a rectangular, a quadratic, a hexagonal or a polygonal inner cross-section. Likewise, the cartridge sleeve may have a circular, an ellipsoidal, an oval, a triangular, a rectangular, a quadratic, a hexagonal or a polygonal outer cross-section.

The cartridge sleeve may be tubular, in particular a cylindrical sleeve or a cylindrical tube. A tubular sleeve, in particular a cylindrical sleeve or a cylindrical tube, is particularly easy to manufacture, in particular by extrusion. Accordingly, the cartridge sleeve may be an extruded cartridge sleeve.

Preferably, the cartridge sleeve is made of a material that is inductively non-heatable, i.e. which is electrically non-conductive and non-magnetic (non-ferromagnetic or non-ferromagnetic). For example, the cartridge sleeve may be made of plastic a silicone. Preferably, the plastic is a thermoplastic, such as PEEK (polyether ether ketone), in order to provide good thermal stability.

The cartridge sleeve may be combined with a distal end cap as described above, which may be mounted to a distal end of the cartridge sleeve. Likewise, the cartridge sleeve may be combined with a proximal end cap as described above, which may be mounted to a proximal end of the cartridge sleeve. In particular, the distal end cap may be mounted to a distal end of the cartridge sleeve by press-fit or by snap-fit or by welding or by an adhesive bond. Likewise, the proximal end cap may be mounted to a proximal end of the cartridge sleeve by press-fit or by snap-fit or by welding or by an adhesive bond.

Where the cartridge sleeve forms a circumferential outer side wall member of the vaporization chamber only or a circumferential outer side wall member of both, the vaporization chamber and the reservoir chamber, the distal end cap preferably is plug-shaped or comprises a cover plate (with or without insertion portion), as described above. In this configuration, the distal end cap forms a distal end wall member of the vaporization chamber.

Where the cartridge sleeve forms a circumferential outer side wall member of the reservoir chamber only, the distal end cap preferably is cup-shaped, as described above. In this configuration, the distal end cap forms both a distal end wall member of the vaporization chamber and a circumferential outer side wall member of the vaporization chamber.

Likewise, where the cartridge sleeve forms a circumferential outer side wall member of the reservoir chamber only or a circumferential outer side wall member of both the vaporization and the reservoir chamber, the proximal end cap preferably is plug-shaped or comprises a cover plate (with or without insertion portion), as described above. In this configuration, the proximal end cap forms a proximal end wall member of the reservoir chamber.

Where the cartridge sleeve forms a circumferential outer side wall member of the vaporization chamber only, the proximal end cap preferably is cup-shaped, as described above. In this configuration, the proximal end cap forms both a proximal end wall member of the reservoir chamber and a circumferential outer side wall member of the reservoir chamber.

Preferably, the cartridge sleeve is non-integral with (separate from) the distal end cap. Likewise, the cartridge sleeve preferably is non-integral with (separate from) the proximal end cap.

In order to reduce the number of components to be assembled, the cartridge may comprise a one-piece main body which comprises a proximal end portion as well as at least one of an outer sleeve portion and an inner tube portion, wherein the outer sleeve portion forms at least a circumferential outer side wall member of the reservoir chamber (or at least a portion thereof), wherein the proximal end portion forms a proximal end wall member of the reservoir chamber, and wherein the inner tube portion forms the vapor-conveying conduit (or at least a portion thereof). The inner tube portion is arranged, in particular coaxially, within the outer sleeve portion and, thus, also an inner wall member of the reservoir chamber. The proximal end portion may include a through hole which the proximal end of the inner tube portion of the vapor-conveying conduit, in particular the proximal end of the inner tube portion, opens in. Preferably, one-piece main body comprises the proximal end portion and both, the outer sleeve portion and the inner tube portion. Advantageously, the outer sleeve portion may also form a circumferential outer side wall member of the vaporization chamber (or at least a portion thereof). Advantageously, such a one-piece main body facilitates the construction and the assembling of the cartridge. The proximal end portion may correspond to the proximal end cap described above forming a proximal end wall member of the reservoir chamber.

In particular, the outer sleeve portion may extend along the entire axial length extension of the reservoir chamber. Alternatively, the outer sleeve portion may extend along the entire axial length extension of the reservoir chamber and the vaporization chamber, that is, preferably along the entire axial extension of the cartridge. The inner tube portion may extend along the entire axial length extension of the reservoir chamber, in particular between the proximal end portion and a septum forming a common wall member of the reservoir chamber and the vaporization chamber. The distal end of the inner tube portion may be mounted to the septum, preferably by press-fit or by snap-fit or by welding or by an adhesive bond. Likewise, the septum may be mounted to the outer sleeve portion, preferably by press-fit or by snap-fit or by welding or by an adhesive bond. The outer sleeve portion may have a circular, an ellipsoidal, an oval, a triangular, a rectangular, a quadratic, a hexagonal or a polygonal inner cross-section; and a circular, an ellipsoidal, an oval, a triangular, a rectangular, a quadratic, a hexagonal or a polygonal outer cross-section. Likewise, the inner tube portion may have a circular, an ellipsoidal, an oval, a triangular, a rectangular, a quadratic, a hexagonal or a polygonal inner cross-section; and a circular, an ellipsoidal, an oval, a triangular, a rectangular, a quadratic, a hexagonal or a polygonal outer cross-section.

Preferably, the one-piece main body is combined with a distal end cap as described further above. That is, the one-piece main body is non-integral with (separate from) the distal end cap. The distal end cap may be mounted to a distal end of the one-piece main body, in particular by press-fit or by snap-fit or by welding or by an adhesive bond. Where the outer sleeve portion forms a circumferential outer side wall member of both, the vaporization chamber and the reservoir chamber, the distal end cap preferably is plug-shaped or comprises a cover plate (with or without insertion portion), as described above. In this configuration, the distal end cap forms a distal end wall member of the vaporization chamber. Where the outer sleeve portion forms a circumferential outer side wall member of the reservoir chamber only, the distal end cap preferably is cup-shaped, as described above. In this configuration, the distal end cap forms both a distal end wall member of the vaporization chamber and a circumferential outer side wall member of the vaporization chamber. Preferably, the one-piece main body is made of a material that is inductively non-heatable, i.e. which is electrically non-conductive and non-magnetic (non-ferromagnetic or non-ferromagnetic). For example, the one-piece main body may be made of plastic a silicone. Preferably, the plastic is a thermoplastic, such as PEEK (polyether ether ketone), in order to provide good thermal stability. The one-piece main body may be manufactured by injection molding. That is, the one-piece main body may be an injection-molded one-piece main body.

The vapor-conveying conduit may be arranged within a circumferential outer side wall member of reservoir member. Where the circumferential outer side wall member of the reservoir member is formed by a cartridge sleeve as described above, the vapor-conveying conduit may be arranged within the cartridge sleeve, in particular coaxially with regard to the cartridge sleeve.

As stated above, the vapor-conveying conduit preferably forms an inner side wall member of the reservoir chamber. Having the vapor-conveying conduit also forming an inner side wall member of the reservoir chamber allows for a very compact design of the cartridge. In this configuration, the volume of the reservoir chamber may be substantially ring shaped, in particular hollow cylindrical.

The vapor-conveying conduit may extend along the axial length extension of the reservoir chamber, in particular between the proximal end of the reservoir chamber and the distal end of the reservoir chamber, more particularly between a proximal end cap (as described above) and a septum forming a common wall member of the reservoir chamber and the vaporization chamber.

In particular, the cartridge may comprise an inner tube forming the vapor-conveying conduit. In particular, the inner tube may be similar to the inner tube portion of the one-piece main body described above, yet separate from any other wall member of the reservoir chamber, such as the proximal end cap and the septum. That is, the inner tube preferably is non-integral with any wall member of the reservoir chamber other than the circumferential inner side wall member of the reservoir chamber.

The inner tube may extend along the entire axial length extension of the reservoir chamber, in particular between the proximal end cap and a septum forming a common wall member of the reservoir chamber and the vaporization chamber. The distal end of the inner tube may be mounted to the septum, for example, to the proximal recess or the proximal insertion socket of the septum. Likewise, the proximal end of the inner tube may be mounted to the proximal end cap, for example, to the distal recess or the distal insertion socket of the proximal end cap. Preferably, the inner tube may be mounted to the septum and the proximal end cap by press-fit or by snap-fit or by welding or by an adhesive bond.

The vapor-conveying conduit, in particular the inner tube may be cylindrical. A cylindrical shape is particularly easy to manufacture, in particular by extrusion. Accordingly, the vapor-conveying conduit may be an extruded vapor-conveying conduit. In particular, the inner tube may be an extruded inner tube.

The vapor-conveying conduit, in particular the inner tube may have a circular, an ellipsoidal, an oval, a triangular, a rectangular, a quadratic, a hexagonal or a polygonal inner cross-section. Likewise, the vapor-conveying conduit, in particular the inner tube may have a circular, an ellipsoidal, an oval, a triangular, a rectangular, a quadratic, a hexagonal or a polygonal outer cross-section.

Preferably, the vapor-conveying conduit, in particular the inner tube is made of a material that is inductively non-heatable, i.e. which is electrically non-conductive and non-magnetic (non-ferromagnetic or non-ferromagnetic). For example, the cartridge sleeve may be made of plastic a silicone. Preferably, the plastic is a thermoplastic, such as PEEK (polyether ether ketone), in order to provide good thermal stability.

As used herein, the term “liquid-conveying susceptor arrangement” refers to a susceptor arrangement which is capable to perform two functions, conveying and heating aerosol-forming liquid. Likewise, the liquid-conveying susceptor arrangement may be considered as an inductively heatable liquid conduit. Using such a liquid-conveying susceptor arrangement advantageously reduces the number of required components and thus facilitates the manufacturing of the cartridge, because it avoids having separate means for conveying and heating the aerosol-forming liquid. As used herein, the term “susceptor arrangement” refers to a component comprising at least one susceptor material that is capable to convert electromagnetic energy into heat when subjected to an alternating magnetic field. This may be the result of at least one of hysteresis losses or eddy currents induced in the susceptor material, depending on the electrical and magnetic properties of the susceptor material. Hysteresis losses occur in ferromagnetic or ferrimagnetic susceptor materials due to magnetic domains within the material being switched under the influence of an alternating electromagnetic field. Eddy currents are induced in electrically conductive susceptor materials. In case of an electrically conductive ferromagnetic or ferrimagnetic susceptor material, heat is generated due to both, eddy currents and hysteresis losses.

In general, the liquid-conveying susceptor arrangement may have any shape and configuration suitable to convey aerosol-forming liquid from the reservoir chamber to the vaporization chamber. In particular, the liquid-conveying susceptor arrangement may comprise a wick element. The configuration of the wick element may be a stranded wire, a stranded rope of material, a mesh, a mesh tube, several concentric mesh tubes, a cloth, sheets of material, or a foam (or other porous solid) with sufficient porosity, a roll of fine metal mesh or some other arrangement of metal foil, fibers or mesh, or any other geometry that is appropriately sized and configured to carry out the wicking action as described herein.

In particular, the liquid-conveying susceptor arrangement may comprise a filament bundle including a plurality of filaments. Preferably, the filament bundle is an unstranded filament bundle. In an unstranded filament bundle, the filaments of the filament bundle run next to each other without crossing each other, preferably along the entire length extension of the filament bundle. Likewise, the filament bundle may comprise a stranded portion, in which the filaments of the filament bundle are stranded. A stranded portion may enhance the mechanical stability of the filament bundle. Using filaments for conveying liquids is particularly advantageous because filaments inherently provide a capillary action. Moreover, in a filament bundle, the capillary action is further enhanced due to the narrow spaces formed between the pluralities of filaments when being bundled. In particular, this applies for a parallel arrangement of the filaments along which the capillary action is constant as the narrow spaces between the filaments do not vary along the parallel arrangement.

As an example, the filament bundle may comprise a parallel-bundle portion along at least a portion of its length extension in which the plurality of filaments may be arranged parallel to each other. The parallel-bundle portion may be arranged at one end portion of the filament bundle or between both end portions of the filament bundle. Alternatively, the parallel-bundle portion may extend along the entire length dimension of the filament bundle.

As another example, the filament bundle may comprise a first soaking section, a second soaking section and an intermediate section between the first soaking section and the second soaking section. Along at least the intermediate section the plurality of filaments may be arranged parallel to each other. With regard to the specific configuration of the article having a reservoir zone and a vaporization zone, each of the first soaking section and the second soaking section may be arranged at least partially in the reservoir chamber, while the intermediate section may be arranged in the vaporization chamber. In particular, the filament bundle may be substantially U-shaped or C-shaped or V-shaped, wherein, the first soaking section and the second soaking section each may form at least partially an arm of the U-shape or the C-shape or the V-shape, respectively, and wherein the intermediate section may form a base of the U-shape or the C-shape or the V-shape, respectively. That is, the arms of the U-shaped or the C-shaped or the V-shaped filament bundle may be arranged at least partially in the reservoir chamber, whereas the base of the U-shaped or the C-shaped or the V-shaped filament bundle may be arranged in the vaporization chamber.

The filament bundle may also be a linear filament bundle, that is, a substantially straight, non-curved or non-bent filament bundle, wherein one end portion of the filament bundle may be arranged in the vaporization chamber, and the other end portion of the filament bundle may be arranged in the reservoir chamber.

The liquid-conveying susceptor arrangement may comprise at least a first susceptor material. In addition, the liquid-conveying susceptor arrangement may comprise a second susceptor material. For example, the liquid-conveying susceptor arrangement may comprise a plurality of first filaments comprising or being made of the first susceptor material and a plurality of second filaments comprising or being made of the second susceptor material.

While the first susceptor material may be optimized with regard to heat loss and thus heating efficiency, the second susceptor material may be used as temperature marker. For this, the second susceptor material preferably comprises one of a ferrimagnetic material or a ferromagnetic material. In particular, the second susceptor material may be chosen such as to have a Curie temperature corresponding to a predefined heating temperature. At its Curie temperature, the magnetic properties of the second susceptor material change from ferromagnetic or ferrimagnetic to paramagnetic, accompanied by a temporary change of its electrical resistance. Thus, by monitoring a corresponding change of the electrical current absorbed by the induction source it can be detected when the second susceptor material has reached its Curie temperature and, thus, when the predefined heating temperature has been reached.

Preferably, the cartridge has a substantially cylindrical shape. The cartridge may have a circular, an ellipsoidal, an oval, a triangular, a rectangular, a quadratic, a hexagonal or a polygonal outer cross-section.

The cartridge may have a length extension in a range between 20 millimeters and 90 millimeters, in particular between 30 millimeters and 40 millimeters, for example 38 millimeters. Likewise, the cartridge may have a diameter in a range between 4 millimeters and 12 millimeters, in particular between 5 millimeters and 10 millimeters, for example 7.5 millimeters.

The reservoir chamber may have a length extension in a range between 10 millimeters and 60 millimeters, in particular between 20 millimeters and 40 millimeters, for example millimeters.

The vaporization chamber may have a length extension in a range between 5 millimeters and 50 millimeters, in particular between 10 millimeters and 30 millimeters, for example 12 millimeters or 13 millimeters or 15 millimeters.

The reservoir chamber may have a volume in range between 100 cubic millimeters and 6000 cubic millimeters, in particular between 400 cubic millimeters and 1000 cubic millimeters.

The vaporization chamber may have a volume in range between 100 cubic millimeters and 6000 cubic millimeters, in particular between 400 cubic millimeters and 1000 cubic millimeters.

The reservoir chamber may be filled with at least one liquid aerosol-forming substrate, that is, an aerosol-forming liquid. Alternatively, the reservoir chamber may be empty. In this configuration, the cartridge may be considered as a blank cartridge for the manufacturing of an aerosol-generating article which is to be filled with liquid aerosol-forming substrate and possibly assembled with other components, for example, a mouthpiece, such as to result in the final article. The reservoir chamber may be configured such as to be refillable, for example, via the filling holes in the proximal end cap or in the septum, as mentioned further above.

As used herein, the term "aerosol-forming liquid" relates to a liquid capable of releasing volatile compounds that can form an aerosol upon heating the aerosol-forming liquid. The aerosol-forming liquid is intended to be heated. The aerosol-forming liquid may contain both, solid and liquid aerosol-forming material or components. The aerosol-forming liquid may comprise a tobacco-containing material containing volatile tobacco flavor compounds, which are released from the liquid upon heating. Alternatively or additionally, the aerosol-forming liquid may comprise a non-tobacco material. The aerosol-forming liquid may further comprise an aerosol former. Examples of suitable aerosol formers are glycerin and propylene glycol. The aerosol-forming liquid may also comprise other additives and ingredients, such as nicotine or flavourants. In particular, the aerosol-forming liquid may include water, solvents, ethanol, plant extracts and natural or artificial flavors. The aerosol-forming liquid may be a water-based aerosol-forming liquid or an oil-based aerosol-forming liquid.

The invention further relates to a stick-shaped aerosol-generating article for use with an inductively heating aerosol-generating device. The article comprises a cartridge according to the invention and as described herein, wherein the vaporization chamber is arranged at a distal end portion of the article.

As used herein, the term "aerosol-generating article" refers to a consumable for usage with an inductively heating aerosol-generating device, in particular a consumable to be discarded after a single use. Alternatively, the article may be configured for multiple uses. For this, the reservoir chamber of the cartridge of the article may be may be configured to be refillable, as described further above. In particular, the article may be configured to be inserted into an inductively heating aerosol-generating device. Preferably, the aerosol-generating article comprises at least one liquid stored in the reservoir chamber of the cartridge that is intended to be heated rather than combusted and that, when heated, releases volatile compounds that can form an aerosol.

The article may comprise a mouthpiece at a proximal end portion of the article. That is, mouthpiece preferably is arranged proximal the cartridge. As used herein, the term "mouthpiece" refers to a portion of the article that can be placed into a user's mouth in order to directly inhale an aerosol from the article. Preferably, the mouthpiece is arranged adjacent the reservoir chamber, in particular adjacent a proximal end wall member of the reservoir chamber. In particular, the mouthpiece may abut the reservoir chamber, in particular adjacent a proximal end wall member of the reservoir chamber.

The mouthpiece may be in fluid communication with the vaporization chamber via the vapor-conveying conduit. Preferably, the vapor-conveying conduit directly opens out into a fluid passage through the mouthpiece. For this, the mouthpiece may comprise vapor inlet at a distal end of the mouthpiece and a vapor outlet at the proximal end of the mouthpiece for releasing vaporized liquid from the article. The fluid passage through the mouthpiece extends from the vapor inlet to the vapor outlet.

The mouthpiece may comprise at least one of an acetate filter plug, a hollow acetate tube, a plastic tube, and an aerosol-cooling element. The filter may be used to filter out undesired components of the aerosol. The mouthpiece may also comprise an add-on material, for example, a flavor material to be added to the aerosol. The hollow acetate tube or the plastic tube may comprise a central air passage. The aerosol-cooling element may allow aerosol escaping from the vapor-conveying conduit of the cartridge to cool down. The aerosol-cooling element may be an element having a large surface area and a low resistance to draw, for example 15 mmWG to 20 mmWG.

The mouthpiece may have a length extension in a range between 3 millimeters and 15 millimeters, in particular between 5 millimeters and 10 millimeters, for example 7 millimeters.

As mentioned further above, the article may further comprise a first wrapper circumferentially wrapped around the vaporization chamber and the reservoir chamber, and preferably—if present—around at least a distal portion of the mouthpiece. Advantageously, the wrapper may serve to keep the mouthpiece and the cartridge together. This results in an article having a stick-like outer shape which is similar or equal to already contemplated articles containing solid substrates and which, thus, is compatible for use with already contemplated aerosol-generating devices. In particular, the wrapper may help to give the article a visual and haptic similarity to conventional cigarettes. For the same purpose, the article may further comprise a second wrapper circumferentially wrapped around the mouthpiece and preferably around a proximal end portion of the cartridge on top of the first wrapper. The second wrapper may further increase visual and haptic similarity to conventional cigarettes. The first wrapper and—if present—the second wrapper may be a paper wrapper. It may also be possible that first the second wrapper is wrapped around the mouthpiece and preferably around a proximal end portion of the cartridge, and that subsequently the first wrapper is wrapped on top of the second wrapper around the vaporization chamber and the reservoir chamber and around at least a distal portion of the mouthpiece. The first and the second wrapper may be wrapped around the mouthpiece and the cartridge such that free ends of the respective wrapper overlap each other. Each of the first wrapper and the second wrapper may comprise adhesive that adheres the free ends of the respective wrapper to each other.

Preferably, the article has a substantially cylindrical shape. The article sleeve may have a circular, an ellipsoidal, an oval, a triangular, a rectangular, a quadratic, a hexagonal or a polygonal outer cross-section.

The distal end wall member of vaporization chamber, in particular the distal end cap of the cartridge—if present—may define a most distal end of the article.

The article may have a length extension in a range between 23 millimeters and 65 millimeters, in particular between 35 millimeters and 50 millimeters, for example 45 millimeters.

Further features and advantages of the aerosol-generating article according to the present invention have already been described with regard to the cartridge according to the present invention and thus equally apply.

According to the invention, there is also provided an aerosol-generating system comprising an aerosol-generating article according to the present invention and as described herein as article.

As used herein, the term "aerosol-generating device" describes an electrically operated device that is capable of interacting with at least one aerosol-generating article including at least one aerosol-forming liquid such as to generate an aerosol by inductively heating the aerosol-forming liquid within the vaporization chamber via the susceptor arrangement of the article. Preferably, the aerosol-generating device is a puffing device for generating an aerosol that is directly inhalable by a user through the user's mouth. In particular, the aerosol-generating device is a hand-held aerosol-generating device.

The device may comprise a receiving cavity for removably receiving at least a portion of the aerosol-generating article, in particular at least a portion of the vaporization chamber of the article.

The aerosol-generating device comprises an inductive heating arrangement configured and arranged to generate an alternating magnetic field in the receiving cavity in order to inductively heat the aerosol-forming liquid in the aerosol-generating article, when the article is received in the aerosol-generating device.

For generating the alternating magnetic field, the inductively heating aerosol-generating device, in particular the inductive heating arrangement may comprise at least one induction coil surrounding at least a portion of the liquid-conveying susceptor arrangement located in the vaporization chamber, when the article is received in the cavity of the device. In particular, the induction coil may exclusively surround a portion of the liquid-conveying susceptor arrangement which is located in the vaporization chamber, when the article is received in the cavity of the device. Preferably, the induction coil is arranged around the receiving cavity, in particular around that portion of the receiving cavity in which the vaporization chamber is located when the article is received in the cavity of the device, more particularly around that portion of the receiving cavity in which a portion of the vaporization chamber comprising a portion of the liquid-conveying susceptor arrangement is located, when the article is received in the cavity of the device. The at least one induction coil may be a helical coil or flat planar coil, in particular a pancake coil or a curved planar coil.

The inductive heating arrangement may comprise an alternating current (AC) generator. The AC generator may be powered by a power supply of the aerosol-generating device. The AC generator is operatively coupled to the at least one induction coil. In particular, the at least one induction coil may be integral part of the AC generator. The AC generator is configured to generate a high frequency oscillating current to be passed through the at least one induction coil for generating an alternating magnetic field. The AC current may be supplied to the at least one induction coil continuously following activation of the system or may be supplied intermittently, such as on a puff by puff basis.

Preferably, the inductive heating arrangement comprises a DC/AC converter including an LC network, wherein the LC network comprises a series connection of a capacitor and the inductor. The DC/AC converter may be connected to a DC power supply.

The inductive heating arrangement preferably is configured to generate a high-frequency magnetic field. As referred to herein, the high-frequency magnetic field may be in the range between 500 kHz (kilo-Hertz) to 30 MHz (Mega-Hertz), in particular between 5 MHz (Mega-Hertz) to 15 MHz (Mega-Hertz), preferably between 5 MHz (Mega-Hertz) and 10 MHz (Mega-Hertz).

The aerosol-generating device may further comprise a controller configured to control operation of the heating process, preferably in a closed-loop configuration, in particular for controlling heating of the aerosol-forming liquid to a pre-determined operating temperature. The operating temperature used for heating the aerosol-forming liquid may be in a range between 100 degree Celsius and 300 degree Celsius, in particular between 150 degree Celsius and 250 degree Celsius, for example 230 degree Celsius.

The controller may be or may be art of an overall controller of the aerosol-generating device. The controller may comprise a microprocessor, for example a programmable microprocessor, a microcontroller, or an application specific integrated chip (ASIC) or other electronic circuitry capable of providing control. The controller may comprise further electronic components, such as at least one DC/AC inverter and/or power amplifiers, for example a Class-C power amplifier or a Class-D power amplifier or Class-E power amplifier. In particular, the induction source may be part of the controller.

The aerosol-generating device may comprise a power supply, in particular a DC power supply configured to provide a DC supply voltage and a DC supply current to the induction source. Preferably, the power supply is a battery such as a lithium iron phosphate battery. The power supply may be rechargeable. The power supply may have a capacity that allows for the storage of enough energy for one or more user experiences. For example, the power supply may have sufficient capacity to allow for the continuous generation of aerosol for a period of around six minutes or for a period that is a multiple of six minutes. In another example, the power supply may have sufficient capacity to allow for a predetermined number of puffs or discrete activations of the induction source.

The aerosol-generating device may further comprise a flux concentrator arranged around at least a portion of the induction coil and configured to distort the alternating magnetic field of the induction coil towards the receiving cavity. Thus, when the article is received in the receiving cavity, the alternating magnetic field is distorted towards the susceptor arrangement. Preferably, the flux concentrator comprises a flux concentrator foil, in particular a multi-layer flux concentrator foil.

Further features and advantages of the aerosol-generating system according to the present invention have already been described with regard to the cartridge and the aerosol-generating article according to the present invention and thus equally apply.

In general, as used herein, sections or components of the cartridge, aerosol-generating article or aerosol-generating device which are close to a user's mouth in use of the system are denoted with the prefix "proximal". Sections which are arranged further away are denoted with the prefix "distal".

The invention is defined in the claims. However, below there is provided a non-exhaustive list of non-limiting examples. Any one or more of the features of these examples may be combined with any one or more features of another example, embodiment, or aspect described herein.

Example Ex1: A cartridge of a stick-shaped aerosol-generating article for use with an inductively heating aerosol-generating device, the cartridge comprising:

- a vaporization chamber at a distal end portion of the cartridge for vaporizing aerosol-forming liquid therein;
- a reservoir chamber proximal the vaporization chamber for storing aerosol-forming liquid;
- a liquid-conveying susceptor arrangement configured and arranged to convey aerosol-forming liquid from the reservoir chamber into the vaporization chamber and to be inductively heated in use with the device in order to vaporize aerosol-forming liquid within the vaporization chamber;
- a vapor-conveying conduit providing a fluid communication for vaporized aerosol-forming liquid from the vaporization chamber to a region proximal the reservoir chamber;
- a distal end cap forming at least a distal end wall member of the vaporization chamber, wherein the distal end cap is non-integral with any wall member of the reservoir chamber.

Example Ex2: The cartridge according to example Ext, wherein the distal end cap is inductively non-heatable.

Example Ex3: The cartridge according to any one of the preceding examples, wherein the distal end cap is made of PEEK or silicone.

Example Ex4: The cartridge according to any one of the preceding examples, wherein the distal end cap defines a most distal end of the cartridge.

Example Ex5: The cartridge according to any one of the preceding examples, wherein the vaporization chamber comprises at least one air inlet formed in the distal end cap.

Example Ex6: The cartridge according to example Ex5, wherein the at least one air inlet comprises an air vent hole through the distal end cap or an air vent groove formed in a surface of the distal end cap facing a wall member of the vaporization chamber other than the distal end cap, in particular a circumferential outer side wall member of the vaporization chamber.

Example Ex7: The cartridge according to any one of the preceding examples, wherein the distal end cap is plug-shaped.

Example Ex8: The cartridge according to example Ex7, wherein the plug-shaped distal end cap comprises a plug body inserted into a circumferential outer side wall member of the vaporization chamber.

Example Ex9: The cartridge according to example Ex8, wherein the plug body is substantially cylindrical or frustoconical.

Example Ex10: The cartridge according to any one of examples Ex8 to Ex9, wherein the plug body comprises a circumferential collar providing a sealing fit of the distal end cap in the cartridge, in particular against the circumferential outer side wall member of the reservoir chamber.

Example Ex11: The cartridge according to example Ex7 wherein the plug-shaped distal end cap comprises a cover plate.

Example Ex12: The cartridge according to any one of the examples Ex7 to Ex11, wherein the plug-shaped distal end cap, in particular the cover plate comprises a protruding collar abutting a distal front end of a circumferential outer side wall member of the vaporization chamber.

Example Ex13: The cartridge according to any one of the examples Ex7 to Ex12, wherein the plug-shaped distal end cap further comprises an insertion portion at least partially inserted in a circumferential outer side wall member of the vaporization chamber.

Example Ex14: The cartridge according to example Ex13 wherein the insertion portion comprises an insertion ring or an insertion tube or an insertion cylinder or an insertion hollow-cylinder or a plurality of insertion ring segments or a plurality of insertion pins or a plurality of insertion fins.

Example Ex15: The cartridge according to any one of the examples Ex13 to Ex14, the insertion portion at least partially extends (from the cover plate) to a septum forming a common wall member of the vaporization chamber and the reservoir chamber.

Example Ex16: The cartridge according to any one of the examples Ex7 to Ex15, wherein the plug-shaped distal end cap comprises at least one, in particular at least two, preferably two, three or four supporting legs extending (from the cover plate) to a septum forming a common wall member of the vaporization chamber and the reservoir chamber.

Example Ex17: The cartridge according to example Ex16, wherein the at least one supporting leg extends along an inner surface of a circumferential outer side wall member of the vaporization chamber.

Example Ex18: The cartridge according to any of examples Ex7 to Ex17, wherein the plug-shaped distal end cap comprises at a proximal end at least one plug member sealingly closing a filling hole in the septum used for filling aerosol-forming liquid into the reservoir chamber via the vaporization chamber.

Example Ex19: The cartridge according to example Ex18, wherein the plug member is arranged at a proximal end of the insertion portion, in particular at a proximal end of the at least one supporting leg.

Example Ex20: The cartridge according to any one of the preceding examples, wherein the distal end cap is cup-shaped.

Example Ex21: The cartridge according to example Ex20, wherein the cup-shaped distal end cap comprises a bottom portion forming the distal end wall member of the vaporization chamber and a sleeve portion forming a circumferential outer side wall member of the vaporization chamber.

Example Ex22: The cartridge according to any one of the preceding examples, wherein the cartridge comprises a proximal end cap forming at least a proximal wall member of the reservoir chamber.

Example Ex23: The cartridge according to any one of the preceding examples, comprising a cartridge sleeve forming at least a circumferential outer side wall member of the vaporization chamber.

Example Ex24: The cartridge according to example Ex23, wherein the cartridge sleeve further forms a circumferential outer side wall member of the reservoir chamber.

Example Ex25: The cartridge according to any one of the preceding examples, wherein the distal end cap is mounted in the cartridge by press-fit or by snap-fit or by welding or by an adhesive bond.

Example Ex26: A stick-shaped aerosol-generating article for use with an inductively heating aerosol-generating device, the article comprising a cartridge according to any one of the preceding examples, wherein the vaporization chamber is arranged at a distal end portion of the article.

Example Ex27: The article according to example Ex26, further comprising a mouthpiece at a proximal end portion of the article.

Example Ex28: Aerosol-generating system comprising an aerosol-generating article according to any one of examples Ex26 to Ex27 and an inductively heating aerosol-generating device for use with the article.

Example Ex29: Aerosol-generating system according to example Ex28, wherein the aerosol-generating device comprises a receiving cavity for removably receiving at least a portion of the aerosol-generating article, in particular at least a portion of the vaporization chamber of the article.

Example Ex30: Aerosol-generating system according to example Ex29, wherein the aerosol-generating device comprises an induction coil surrounding at least a portion of the liquid-conveying susceptor arrangement located in the vaporization chamber, when the article is received in the cavity of the device.

Examples will now be further described with reference to the figures in which:

FIG. 1 schematically illustrates the general structure and components of an aerosol-generating article according to the present invention.

Figure 1:
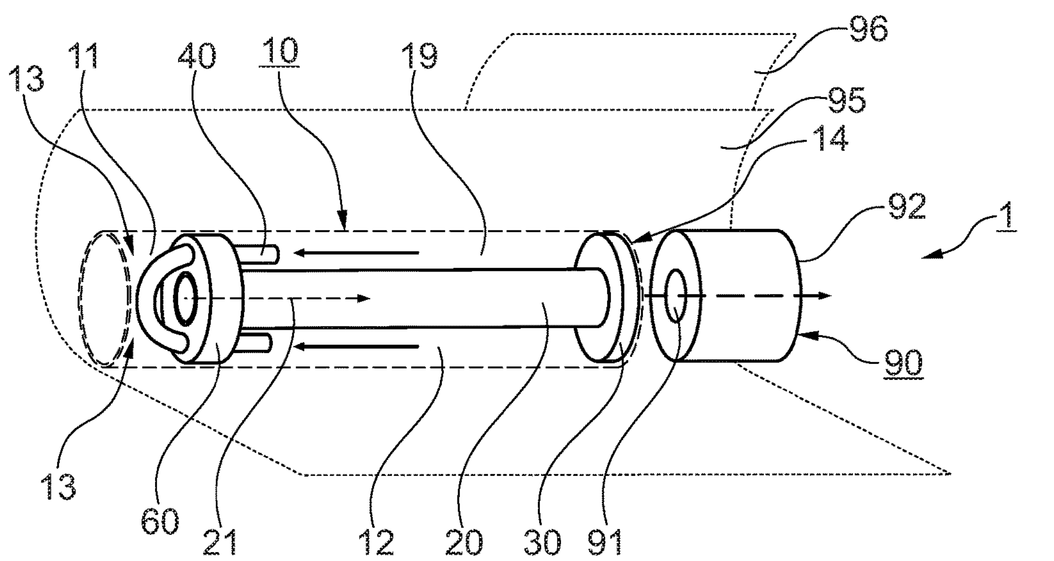

FIG. 1 schematically illustrates the general structure and components of a stick-shaped aerosol-generating article 1 according to the present invention in an explosion view. As will be described in more detail further below with regard to FIG. 3, the aerosol-generating article 1 is configured for use with an inductively heating aerosol-generating device in order to vaporize an aerosol-forming liquid 19 provided by the aerosol-generating article 1.

The aerosol-generating article 1 as shown in FIG. 1 comprises two main components: a cylindrical cartridge 10 for storing and vaporizing aerosol-forming liquid 19 therein as well as a cylindrical mouthpiece 90 which a user may puff on in order to cause an airflow through the article 1 (as indicated by the dashed arrow 21), in which volatile compounds released from the heated aerosol-forming liquid 19 are entrained and condense such as to form an aerosol which exits the article 1 at the proximal end 92 of the mouthpiece 90.

According to the present invention, the cartridge 10 comprises a vaporization chamber 11 at a distal end portion of the cartridge 10 for vaporizing aerosol-forming liquid therein The vaporization chamber 11 comprises two air inlets 13 allowing air to enter the article when a user takes a puff at the mouthpiece 90. The cartridge 10 further comprises a reservoir chamber 12 proximal the vaporization chamber 11 for storing the aerosol-forming liquid 19. Furthermore, the cartridge 10 comprises a liquid-conveying susceptor arrangement 40 which is configured and arranged to convey aerosol-forming liquid 19 from the reservoir chamber 12 into the vaporization chamber 11. In addition, the liquid-conveying susceptor arrangement 40 is configured and arranged to be inductively heated when exposed to an alternating magnetic field in use with a corresponding aerosol-generating device in order to vaporize aerosol-forming liquid 19 within the vaporization chamber 11. Furthermore, the cartridge 10 comprises a vapor-conveying conduit 20 providing a fluid communication for air and vaporized aerosol-forming liquid from the vaporization chamber 11 to a region proximal the reservoir chamber 13, that is, to the mouthpiece 90 which is arranged adjacent a proximal end wall member 14 of the reservoir chamber 12. As can be further seen in FIG. 1, the mouthpiece 90 of the present example comprises a hollow acetate tube providing a central fluid passage 91 through the mouthpiece 90 into which the vapor-conveying conduit 20 directly opens out in order to allow aerosol formed within the article to escape from the article via the vapor outlet of the fluid passage 91 at the proximal end 92 of the mouthpiece 90.

The cartridge 10 and the mouthpiece 90 are separate parts, which may be manufactured separately, in particular at different locations, and subsequently assembled together in order to form an aerosol-generating article 1 according to the present invention. For the assembly, the cylindrical mouthpiece 90, which has about the same cross-sectional shape and diameter as the cylindrical cartridge 10, may be arranged adjacent the cartridge 10 proximal the reservoir chamber 12 such as to abut the proximal end wall member 14 of the reservoir chamber 12. Subsequently, as indicated in FIG. 1, a first wrapper 95 may be wrapped around at least an axial portion of the cartridge 10 and the mouthpiece 90 in order to keep the mouthpiece 90 and the cartridge 10 together. As also indicated in FIG. 1, a second wrapper 96 may be circumferentially wrapped around the mouthpiece 90 and preferably around a proximal end portion of the cartridge 10 on top of the first wrapper 95. The first wrapper 95 and the second wrapper 96 may be wrapped around the mouthpiece 90 and the cartridge 10 such that free ends of the respective wrapper 95, 96 overlap each other. Each of the first wrapper and the second wrapper may comprise adhesive that adheres the free ends of the respective wrapper to each other. This process finally results in an aerosol-generating article 1 having a stick-like outer shape similar or equal to already contemplated articles containing solid substrates, for example, as described in WO 2015/177294 A1.

Figure 2:
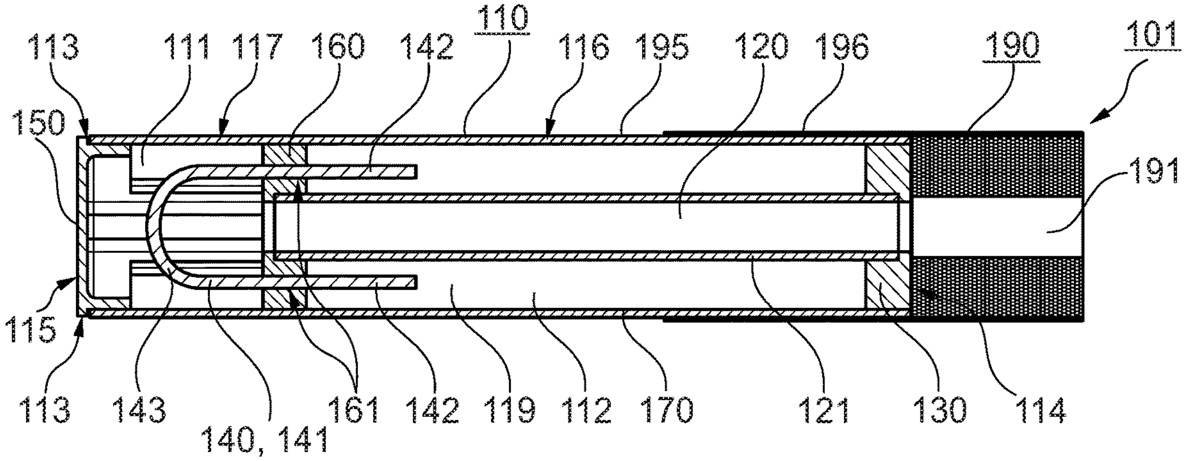
FIG. 2 shows an aerosol-generating article according to a first embodiment of the present invention.

A first exemplary embodiment of such an article 101 is shown in FIG. 2. Features which are identical or similar to the features of the general article design schematically shown in FIG. 1 are denoted with the same reference signs, yet incremented by 100. Further details of the article 101, in particular of the cartridge 110 and its components, are described further below with respect to FIGS. 4-7. According to the general article design, the article 101 comprises a cylindrical cartridge 110 and a cylindrical mouthpiece 190 formed by a hollow acetate tube which are arranged coaxially next to each other and wrapped by a first and second paper wrapper 195, 196. The cartridge 110 comprises a cylindrical cartridge sleeve 170 forming in one-piece a circumferential outer side wall member 117 of the vaporization chamber 111 and a circumferential outer side wall member 116 of the reservoir chamber 112. The cartridge 110 further comprises a proximal end cap 130 which forms a proximal end wall member 114 of the reservoir chamber 112. Likewise, the cartridge 110 comprises a distal end cap 150 which forms a distal end wall member 115 of the vaporization chamber 111. Both, the proximal end cap 130 and the distal end cap 150 are mounted by press-fit in the proximal opening and the distal opening of the cartridge sleeve 170, respectively. The cartridge further comprises a dis-shaped septum 160 which forms a common wall member of the vaporization chamber 111 and the reservoir chamber 112 and thus separates the interior of the vaporization chamber 111 from the interior of the reservoir chamber 112. Like the proximal end cap 130 and the distal end cap 150, the disc-shaped septum 160 is mounted by press-fit in the cartridge sleeve 170 between its both ends such that the interior of the cartridge sleeve 170 is divided in a ratio of about 1 to 3.

In order to convey aerosol-forming liquid 119 stored in the reservoir chamber 112 into the vaporization chamber 111, the cartridge 110 according to the present embodiment comprises a liquid-conveying susceptor arrangement 140 that is formed by a U-shaped filament bundle 141 which comprises a plurality of filaments arranged parallel to each other. Due to the parallel arrangement of the filaments in the bundle, narrow spaces are formed between the pluralities of filaments, which provide a capillary action and thus are capable of conveying liquid along the length extension of the filaments. At least a portion of the filaments is made of an inductively heatable material, for example, stainless steel. Therefore, the filament bundle 141 is able to perform two functions, conveying and heating aerosol-forming liquid. As can be seen in FIG. 2, the U-shaped filament bundle 141 comprises a base and two arms, wherein the arms pass through respective feedthroughs 161 in the septum 160. A respective distal portion of each arm is arranged in the reservoir chamber 112 for soaking aerosol-forming liquid 119. Therefore, the distal portions of the two arms may be denoted as soaking sections 142. In contrast, the base and the respective proximal portion of each arm are arranged within the vaporization chamber such as to form a vaporization section 143 which is inductively heatable when exposed to an alternating magnetic field. In doing so, aerosol-forming liquid 119, which has been conveyed from the reservoir chamber 112 via the soaking sections 142 towards the vaporization section 143, is vaporized within the vaporization chamber 111. In order to allow air to enter the article 101 for the aerosol generation, the vaporization chamber 111 comprises two air inlets 113 at the distal end of the article 101. For conveying air and vaporized liquid in the proximal direction to the mouthpiece 190, the cartridge 110 according to the present embodiment comprises an inner tube 121 which forms a conveying conduit 120 that provides a fluid communication between the vaporization chamber 111 and the central passage 191 of the mouthpiece 190. Further details of the proximal end cap 130, the distal end cap 150, the inner tube 121 and the septum 160 are described further below with reference to FIGS. 4-7.

Figure 3:
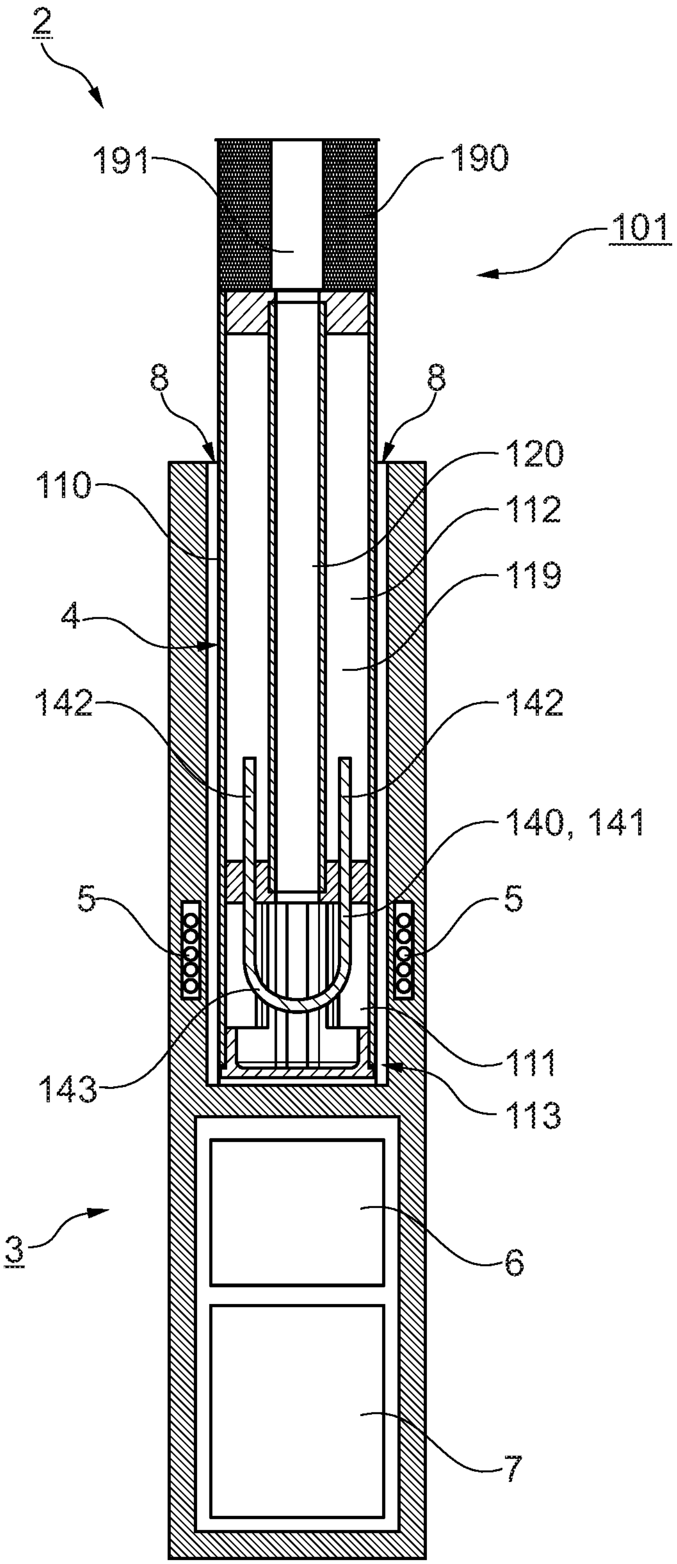
FIG. 3 shows an aerosol-generating system according to the present invention comprising an inductively heating aerosol-generating device and an aerosol-generating article according to FIG. 2.

Due to the stick-like outer shape and the arrangement of the vaporization chamber 111 at the distal end portion of the cylindrical article 101, the article 101 is compatible for use with an inductively heating aerosol-generating device 3 already contemplated for solid substrate consumables, as will be know described with respect to FIG. 3. Due to this, the device may be universally used with different kinds of articles in order to generate aerosols from different kinds of aerosol-forming substrates, in particular from both solid and liquid substrates.

FIG. 3 schematically illustrates an aerosol-generating system 2 according to an exemplary embodiment of the present invention. The system 2 comprises an aerosol-generating article 101 as shown in FIG. 2 as well as an inductively heating aerosol-generating device 3 that is capable of interacting with the article 101 in order to generate an aerosol. For this, the aerosol-generating device 3 comprises a receiving cavity 4 formed within the device housing at a proximal end of the device 3. The receiving cavity 4 is configured to removably receive at least a portion of the aerosol-generating article 101. In particular, the aerosol-generating device 3 is configured to inductively heat the heating section 143 of the filament bundle 141 to a temperature which is sufficient to vaporize aerosol-forming liquid conveyed from the reservoir chamber 112 to the heating section 143 via the soaking sections 142. For this, the device 3 comprises an inductive heating arrangement including an induction coil 5. In the present embodiment, the induction coil 5 is a single helical coil which is arranged around the proximal end portion of the receiving cavity 4 such as to only surround the heating section 143 of the liquid-conveying susceptor arrangement 140, when the article 101 is received in the cavity 4. Accordingly, when driving the induction coil 5 with an AC current in use of the device 3, the induction coil 5 generates an alternating magnetic field which mostly penetrates the heating section 143 in the vaporization chamber 111 of the article 101. In contrast, due to the local heating, the soaking sections 142 of the U-shaped filament bundle 141 stay at temperatures below the vaporization temperature. Thus, boiling of aerosol-forming liquid 191 within the reservoir chamber 112 is prevented. Hence, during operation the liquid-conveying susceptor arrangement 140 comprises a temperature profile which shows a temperature increase from temperatures below a vaporization temperature of the aerosol-forming liquid 191 in the soaking sections 142 to temperatures above the respective vaporization temperature in the heating section 143. The aerosol-generating device 3 further comprises a controller 6 for controlling operation of the entire system 2, in particular for controlling the heating operation. Furthermore, the aerosol-generating device 3 comprises a power supply 7 providing electrical power for generating the alternating magnetic field. Preferably, the power supply 7 is a battery such as a lithium iron phosphate battery. The power supply 7 may have a capacity that allows for the storage of enough energy for one or more user experiences. Both, the controller 6 and the power supply 7 arranged in a distal portion of the aerosol-generating device 3.

In use of the system 2, when a user takes a puff at the mouthpiece 190, air is drawn into the cavity 4 at the rim of the article insertion opening 8. The air flow further extends towards the distal end of the cavity 4 through a passage which is formed between the inner surface of the cylindrical cavity 4 and the outer surface of the article 101. At the distal end of the cavity 4, the air flow enters the vaporization chamber 111 through the air inlets 113. From there, the airflow further passes through the vapor-conveying conduit 120 to the mouthpiece 190 where it finally exits the article 101. In the vaporization chamber 111, vaporized aerosol-forming liquid 119 is entrained into the airflow. When further passing through the vapor-conveying conduit 120 and the central air passage 191 of the mouthpiece 190, the flow of air and vaporized liquid 119 cools down such as to form an aerosol escaping the article 101 through the mouthpiece 190.

Figure 4:
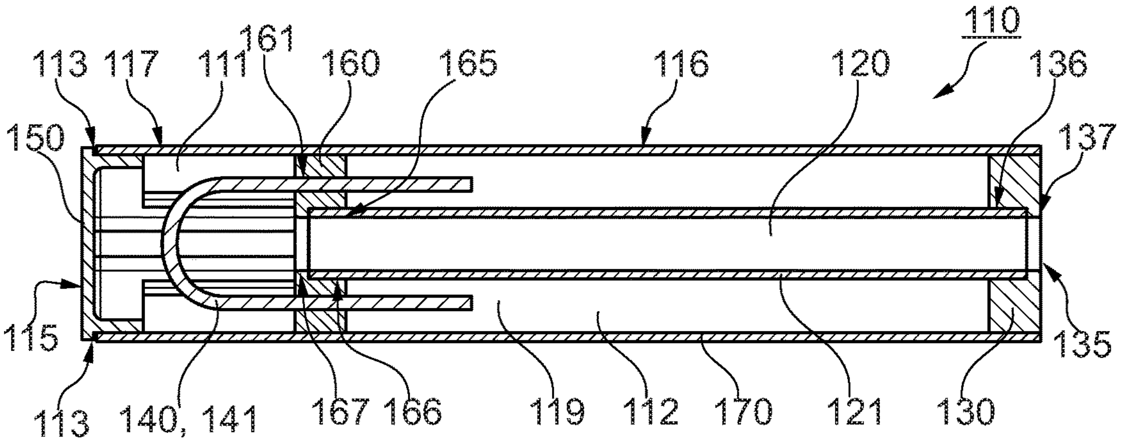
FIGS. 4-7 show details of the cartridge according to the embodiment which used in the aerosol-generating article according to FIG. 2.
Figure 5:
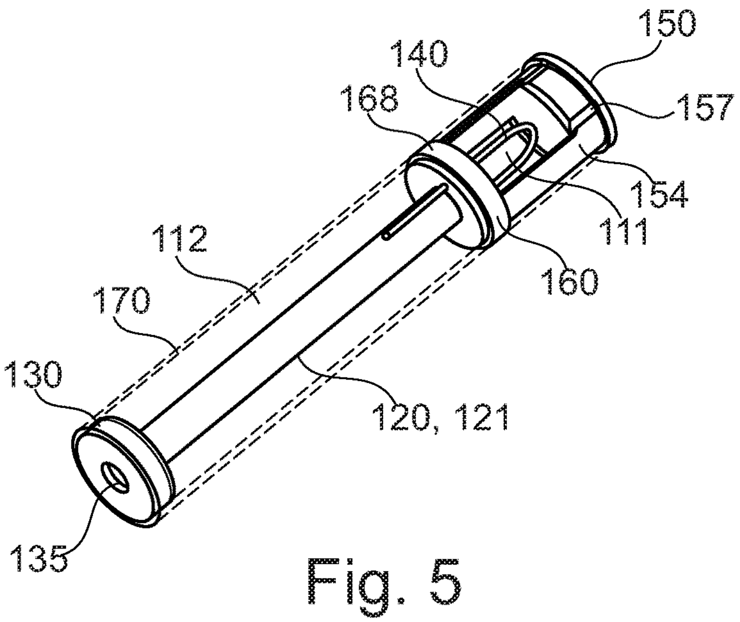
Figure 6:
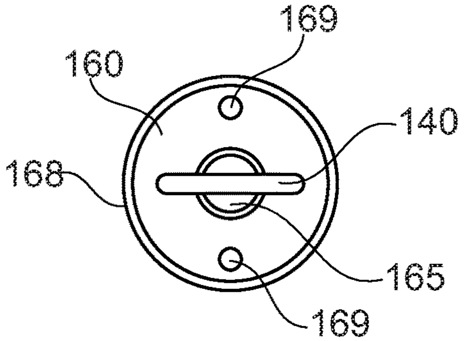
Figure 7:
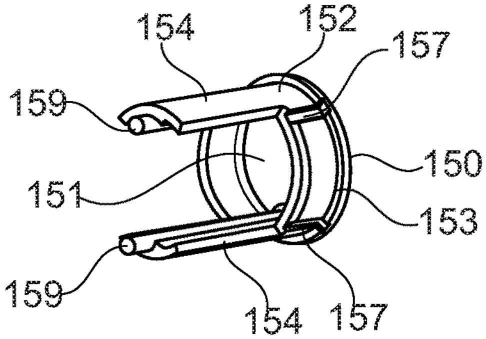
Figure 8:
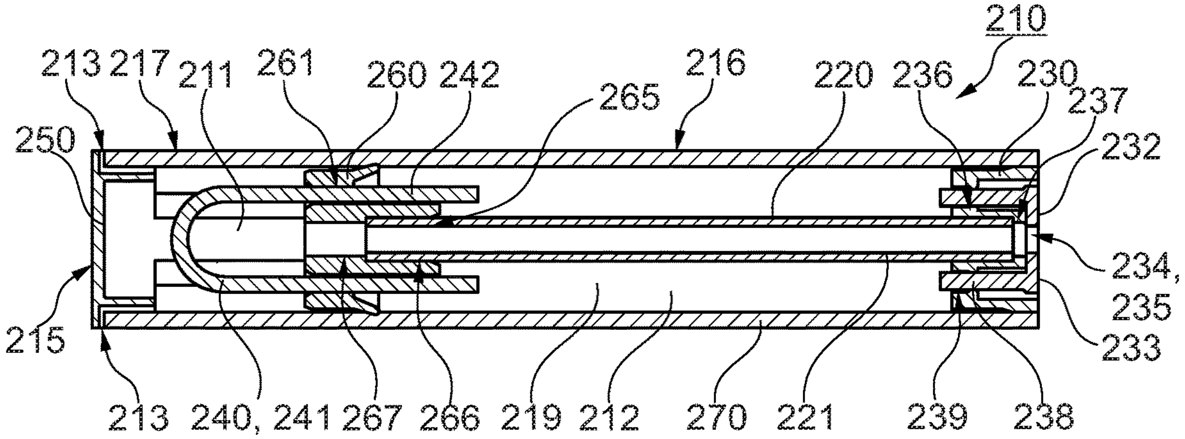
FIGS. 8-11 show details of a second embodiment of a cartridge which may be alternatively used in the aerosol-generating article according to FIG. 2.
Figure 9:
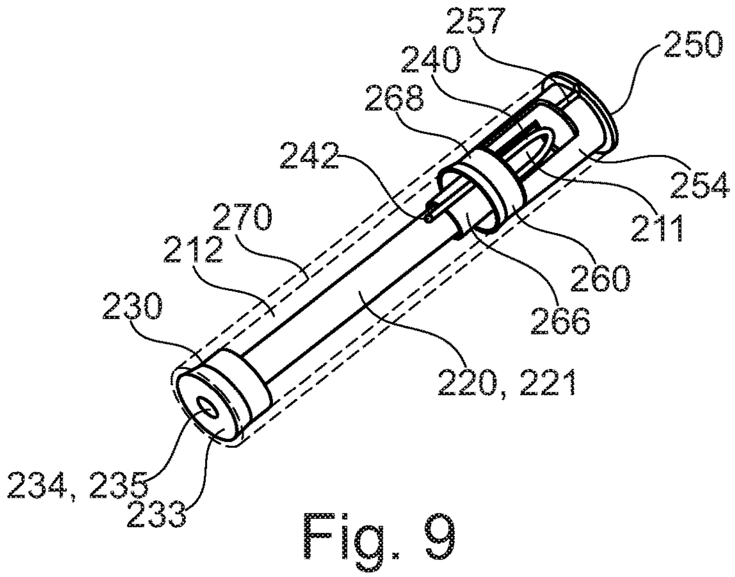

With reference to FIGS. 4-7, further details of the cartridge 110 of the article 101 according to FIGS. 2-3 are now described. FIG. 4 is an enlarged view of FIG. 2, yet without showing the mouthpiece 190 and the first and second wrapper 195,196. Likewise, FIG. 5 is a perspective view of the cartridge 110 according to FIG. 2. FIG. 6 shows a front view of the septum 160 as seen in the proximal direction, whereas FIG. 7 shows a perspective view of the distal end cap 150.

As can be seen from FIG. 4 and FIG. 5, the inner tube 121 forming the vapor-conveying conduit 120 is a cylindrical tube having a circular inner cross-section and a circular outer cross-section. Preferably, the inner tube 121 is made of plastic. Due to the cylindrical shape it may be advantageously manufactured by extrusion. As can be further seen from FIG. 4 and FIG. 5, the inner tube 121 extends coaxially with the cartridge sleeve 170 from the proximal end cap 130 to the septum 160 along the entire axial length extension of the reservoir chamber 112. As such, the inner tube 121 also forms an inner side wall member of the reservoir chamber 112. Due to this, the volume of the reservoir chamber 112 is substantially hollow cylindrical. In particular, the inner tube 121 is non-integral (separate from) with the plug-shoed proximal end cap 130 and the disc-shaped septum 160. As can be best seen in FIG. 4, the proximal end cap 130 comprises a through hole 135 in continuation of the fluid communication provided by the vapor-conveying conduit 120. In particular, the proximal end cap 130 comprises a distal recess 136 forming a distal portion of the through hole 135 which the proximal end portion of the inner tube 121 is supported in. The inner cross-section of the distal recess 136 is larger than the inner cross-section of the remaining proximal portion 137 of the through hole 135. Due to this, the distal recess 136 forms an abutment for the inner tube 121 in order to fix its position in the proximal direction. The inner cross-section of the proximal portion 137 of the through hole 135 corresponds to the inner cross-section of the inner tube 121 such that the airflow passage through the vapor-conveying conduit 120 smoothly continues through the proximal portion 137 of the through hole 135.

In a similar way, a distal end portion of the inner tube 121 is supported in a through hole 165 of the septum 160 which connects the vapor-conveying conduit 120 with the vaporization chamber 111. Like the proximal end cap 130, the septum 160 comprises a proximal recess 166 forming a proximal portion of the through hole 165 which the vapor-conveying conduit is supported in at a distal end portion. An inner cross-section of the proximal recess 166 is larger than an inner cross-section of the remaining distal portion 167 of the through hole 165 such as to provide an abutment for the inner tube 121 in the distal direction. To ensure smooth continuation of the airflow passage from the vaporization chamber 111 into the vapor-conveying conduit 120 the inner cross-section of the distal portion 167 of the through hole 165 corresponds to the inner cross-section of the inner tube 121. Having both ends of the inner tube 121 being supported in the recess 136, 166 proves particularly advantageous with regard a proper sealing fit between the vapor-conveying conduit 140 and the end wall members of the reservoir chamber 112.

As already described above, the septum 160 also comprises two feedthrough openings 161 which the arms of the U-shaped for the filament bundle 141 pass through. The cross-sectional dimensions of the feedthrough openings 161 are chosen such that the liquid-conveying susceptor arrangement 140 is fixedly hold by the septum 160. Advantageously, the liquid-conveying susceptor arrangement 140 is fixed in the septum 160 prior to assembling the cartridge 110 in order to facilitate the assembly. As shown in FIG. 6, the septum further comprise two filling holes 169 being laterally arranged at opposite sides of the through hole 165 for filling aerosol-forming liquid 191 into the reservoir chamber 112 via the vaporization chamber 111 prior to mounting the distal end cap 150 to the distal end of the cartridge sleeve 170.

Furthermore, the septum 160 comprises a circumferential collar 168 which has a cross-sectional shape corresponding to the inner cross-section of the cartridge sleeve 170 shape. Thus, the collar 168 serves to fixedly mount the septum 160 in the cartridge 110 by press-fit. In addition, the collar 168 provides a sealing fit of the septum 160 against the inner surface of the cartridge sleeve 170, thus avoiding leakage of aerosol-forming liquid from the reservoir chamber 112 into the vaporization chamber.

The plug body of the proximal end cap 130, which is fully inserted in the proximal end of the cartridge sleeve 170, also has a cross-sectional shape corresponding to the inner cross-section of the cartridge sleeve 170. Due to this, the proximal end cap 130 is also sealingly and fixedly mounted in the cartridge sleeve 170 by press-fit.

Both, the proximal end cap 130 and the septum preferably are made of silicone. Silicone has proper sealing properties and is cheap which is of particular interest with regard to the fact that the cartridge 110 preferably is used in an aerosol-generating article 101 configured for single use only. Also, silicone is inductively non-heatable which prevents energy provided by the alternating magnetic field from being unnecessarily dissipated in the septum 160 and the proximal end cap 130.

As can be best seen in FIG. 7 in combination with FIG. 4 and FIG. 5, the plug-shaped distal end cap 150 comprises a cover plate 151 and an insertion portion 152. The cover plate 151 extends radially outwards beyond the insertion portion 152 and the inner cross-section of the cartridge sleeve 170 such as to abut a distal front end of the cartridge sleeve 170. The insertion portion 152 is inserted in the distal end portion of the cartridge sleeve 170 which forms the circumferential outer side wall member 117 of the vaporization chamber 111. In the present embodiment, the insertion portion 152 comprises an insertion ring 153 and two supporting legs 154 which extend along the inner surface of the circumferential outer side wall member 117 of the vaporization chamber 111. The length of the supporting legs 154 is chosen such that the legs 154 abut the septum 160 and the cover plate 151 abuts the distal front end of the cartridge sleeve 170, when the distal end plug 150 is mounted in the cartridge 110. Due to this, the distal end cap 150 is fixed in position in the proximal direction. Vice versa, the septum 160 is fixed in the distal direction, and via the inner tube 121 and the proximal end cap also in the proximal direction.

In addition, the plug-shaped distal end cap 150 comprise at the proximal end of each supporting leg 154 a plug member 159 for sealingly closing the filling holes 169 in the septum 160 when the distal end plug 150 is mounted in the cartridge 110. Advantageously, this configuration enables to seal the filling holes 169 and to close the distal end of the vaporization chamber 111 in a single step by mounting the plug-shaped distal end cap 150.

According to the present embodiment, the air inlets 113 in the vaporization chamber 111 are formed in the distal end cap 150. As can be best seen in FIG. 7, each air inlet 113 comprises an air vent groove 157 formed in outer surface of the distal end cap 150 facing the cartridge sleeve 117, that is, in outer surface of the insertion ring 153 and the outer portion of the cover plate 151.

Preferably, the distal end cap 150 and the cartridge 117 are made of PEEK in order to provide good thermal stability of the article 101. In addition, PEEK is inductively non-heatable, thus preventing a user from getting burned when touching the article 101 shortly after a heating process.

FIGS. 8-11 show a second embodiment of a cartridge 210 according to the present invention which may be alternatively used in the aerosol-generating article according to FIG. 2. The general setup of this cartridge is similar to the setup of the cartridge shown in FIGS. 4-7. Therefore, identical or similar features are denoted with the same reference signs, yet incremented by 100. In contrast to the first embodiment according to FIGS. 4-7, the cartridge 210 according to FIGS. 8-11 comprises a cylindrical inner tube 221 having an elliptical inner and outer cross-section. Advantageously, the elliptical cross-section provides more free space in the reservoir chamber for arranging the soaking sections 242 of the filament bundle 241 on both sides of the major axis of the elliptical inner tube 221. Accordingly, the through hole 235 in the proximal end cap 230 and the through hole 265 in the septum 260 also have an elliptical cross-section corresponding to the dimensions and orientation of the elliptical inner and outer cross-section of the inner tube 221.

Figure 10:
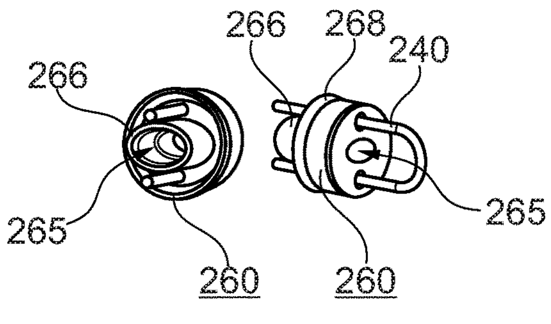

Further in contrast to the first embodiment according to FIGS. 4-7, the septum 260 of the cartridge 210 according to FIGS. 8-11 comprises a proximal insertion socket 266 protruding into the reservoir chamber 212. Details of the septum 260, in particular of the proximal insertion socket 266 are shown in FIG. 10. The proximal insertion socket 260 forms a proximal portion of the through hole 265 which a distal end portion of the inner tube 221 is supported in. As such, the proximal insertion socket 266 may be considered as a protrusion extending into the reservoir chamber 212 which comprises a recess that forms a proximal portion of the through hole 265. The elliptical inner cross-section of the proximal insertion socket 266 is larger than the elliptical inner cross-section of the remaining distal portion 267 of the through hole 265, thus providing an abutment for the distal end portion of the inner tube 221 in the distal direction. In order to provide a substantially smooth airflow passage through the cartridge 210, the elliptical inner cross-section of the distal portion 267 of the through hole 265 corresponds to the elliptical inner cross-section of the inner tube 221.

Figure 11:
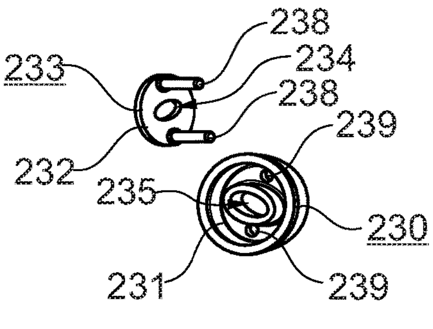

As can be further seen in FIG. 10, the septum 260 of the cartridge 210 according to the second embodiment does not comprise any filling holes, contrary to the first embodiment according to FIGS. 4-7. Instead, as shown in FIG. 11, it is the proximal end cap 230 which comprises two filling holes 239 being laterally arranged at opposite sides of the elliptical through hole 235 for filling aerosol-forming liquid 291 into the reservoir chamber 212 via the proximal end of the cartridge 210. For sealingly closing the filling holes 239 upon having filled the reservoir chamber 212, the cartridge 210 comprises a proximal plug member 233, details of which are also shown in FIG. 11. In order to have a substantially flat proximal face at the proximal end of the cartridge 210, the proximal end cap 230 comprises a proximal recess 231 which the proximal plug member 233 is received in. The one or more filling holes may be arranged adjacent the through hole 235 of the proximal end cap. For example, the proximal end cap may comprise two filling holes being laterally arranged at opposite sides of the through hole. The proximal plug member 233 comprises a disc 232 with protrusions 238 sealingly fitting into the filling holes 239 of the proximal end cap 230. To enable aerosol to freely escape from the cartridge 210 into the proximal direction, the proximal plug member 233 comprises a through hole 234 in the disc 232 congruent with the through hole 235 of the proximal end cap 230. Preferably, a cross-section of the through hole 234 of the proximal plug member corresponds to an inner cross-section of the vapor-conveying conduit 220 in order to provide a smooth airflow passage.

Figure 12:
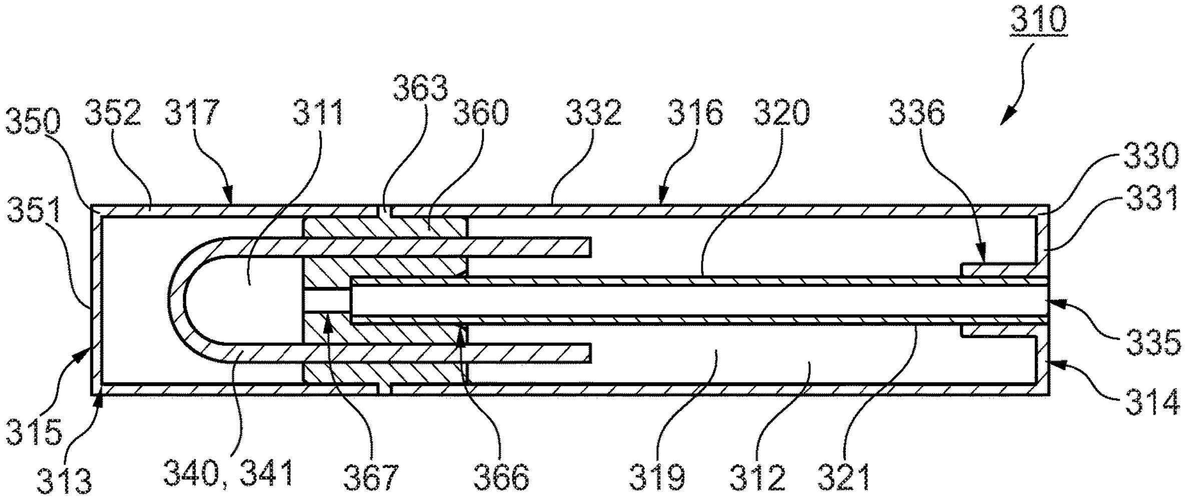
FIGS. 12-13 show details of a third embodiment of a cartridge which may be alternatively used in the aerosol-generating article according to FIG. 2.
Figure 13:
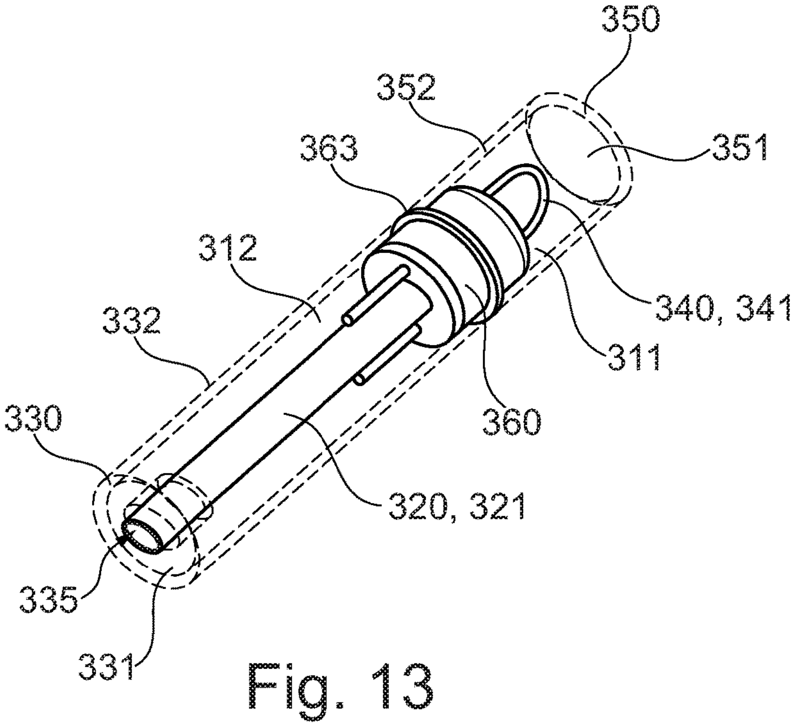

FIGS. 12-13 show a third embodiment of a cartridge 310 according to the present invention which may be alternatively used in the aerosol-generating article according to FIG. 2. The general setup of this cartridge is similar to the setup of the cartridge shown in FIGS. 4-7. Therefore, identical or similar features are denoted with the same reference signs, yet incremented by 200. In contrast to the first embodiment according to FIGS. 4-7, the cartridge 310 according to FIGS. 12-13 does not comprise a cylindrical cartridge sleeve, but a cup-shaped proximal end cap 330 and a cup-shaped distal end cap 350. The cup-shaped proximal end cap 330 comprise a bottom portion 331 forming the proximal end wall member 314 of the reservoir chamber 312 and a sleeve portion 332 (side wall of the cup-shaped) forming a circumferential outer side wall member 315 of the reservoir chamber 312. Likewise, the cup-shaped distal end cap 350 comprises a bottom portion 351 forming the distal end wall member 315 of the vaporization chamber 311 and a sleeve portion 352 (side wall of the cup shape) forming a circumferential outer side wall member 317 of the vaporization chamber 311. In this configuration, the reservoir chamber 312 and the vaporization chamber are substantially fully formed by the proximal end cap 330 and the distal end cap 350, respectively. The missing wall members are formed by the septum 360 which is also used as joining link which the proximal end cap 330 and the distal end cap 350 are attached to by press-fit. As can be seen in FIG. 12, the septum 360 comprises a circumferential protrusion 363 which the distal face of the sleeve portion 332 and the proximal face of the sleeve portion 352 abut against.

Further in contrast to the first embodiment according to FIGS. 4-7, the cup-shaped proximal end cap 330 of the cartridge 210 according to FIGS. 12-13 comprises—similar to the septum 260 according to FIGS. 8-11—a distal insertion socket 336 protruding into the reservoir chamber 312, which forms the through hole 335 and which a proximal end portion of the vapor-conveying conduit 320 is fully supported in.

Figure 14:
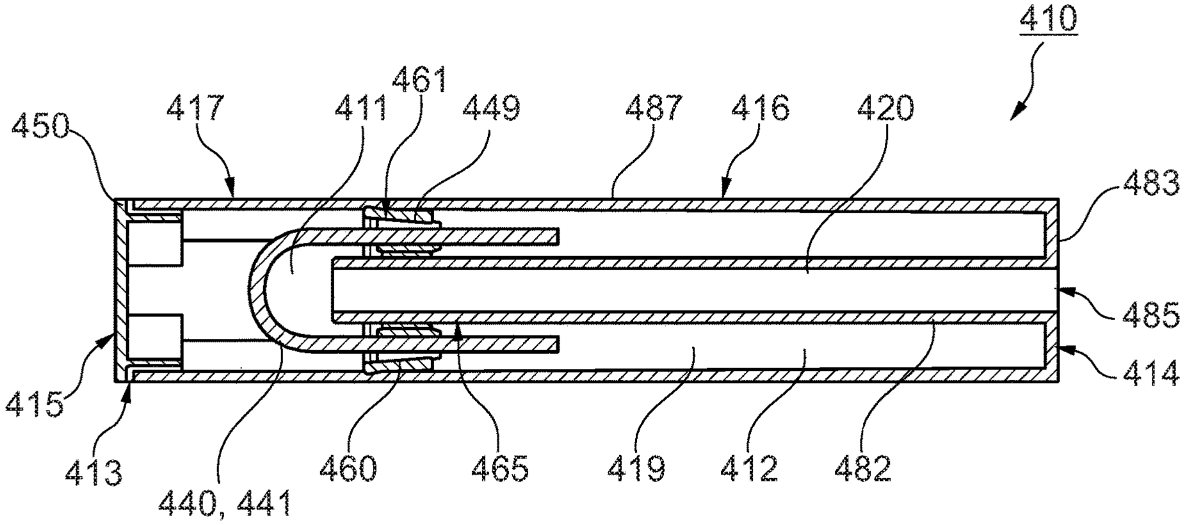
FIGS. 14-16 show details of a fourth embodiment of a cartridge which may be alternatively used in the aerosol-generating article according to FIG. 2.
Figure 15:
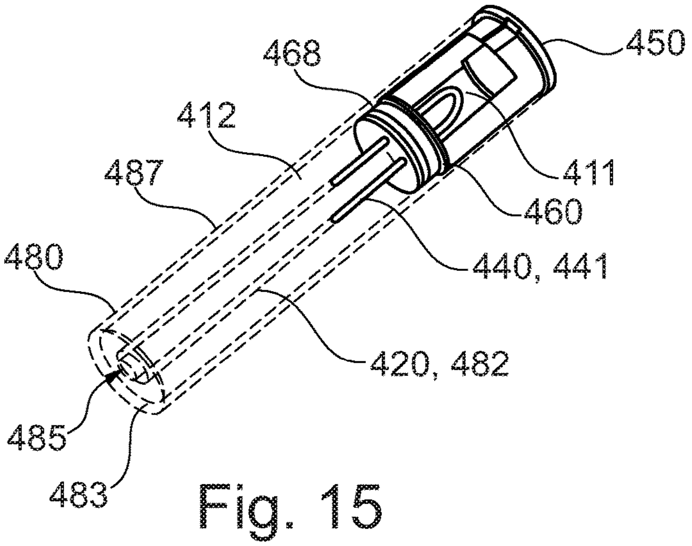
Figure 16:
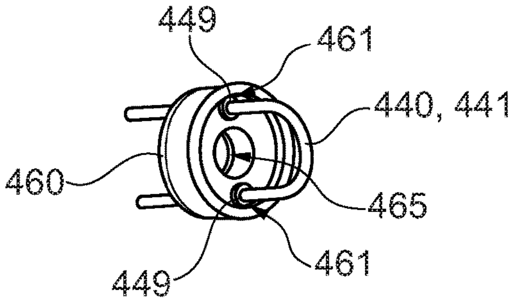

FIGS. 14-16 show a fourth embodiment of a cartridge 410 according to the present invention which may be alternatively used in the aerosol-generating article according to FIG. 2. The general setup of this cartridge is similar to the setup of the cartridge shown in FIGS. 4-7. Therefore, identical or similar features are denoted with the same reference signs, yet incremented by 300. In contrast to the first embodiment according to FIGS. 4-7, the cartridge 410 according to FIGS. 14-16 does not comprise a cartridge sleeve, an inner tube and a proximal end cap separate from each other. Instead, the cartridge 410 comprises a one-piece main body 480 which comprises a proximal end portion 483, an outer sleeve portion 487 and an inner tube portion 482 which is arranged coaxially within the outer sleeve portion 487. The outer sleeve portion 487 extends along the entire axial length extension of the reservoir chamber 412 and the vaporization chamber 411 and, thus, forms circumferential outer side wall member 416 of the reservoir chamber 412 as well as a circumferential outer side wall member 417 of the vaporization chamber 411. The proximal end portion 483 forms a proximal end wall member 414 of the reservoir chamber 412, including a through hole 485 which the proximal end of the inner tube portion 482 opens in. The inner tube portion 482 forms the vapor-conveying conduit 420 and at the same time an inner wall member of the hollow-cylindrical reservoir chamber 412. In the present embodiment, the inner tube portion 482 extends along the entire axial length extension of the reservoir chamber 412 and passes further through a through hole 465 of the septum 460 into the vaporization chamber 411. Advantageously, such a one-piece main body 410 facilitates the construction and the assembling of the cartridge 410. The proximal end portion may correspond to the proximal end cap described above forming a proximal end wall member of the reservoir chamber. Like in the other embodiments, the septum 460 is mounted within the outer sleeve portion 487, preferably by press-fit or by snap-fit or by welding or by an adhesive bond, using a collar 468. The one-piece main body 480 is combined with a distal end cap 450 as described further above, which is non-integral with the one-piece main body 480 and mounted to a distal end of the one-piece main body 480 by press-fit or by snap-fit or by welding or by an adhesive bond. Both, the one-piece main body 480 and the distal end cap 450 preferably are injection molded using PEEK in order to prevent a user from getting burned when touching an article including the cartridge 410 shortly after a heating process.

With reference to FIG. 16, the cartridge 410 further comprises sealing rings 449 for each of the feedthrough openings 461 of the septum 460. In the present embodiment, the sealing rings 449 are overmolded around those portions of the liquid-conveying susceptor arrangement 440 which pass through the feedthrough openings 461. Advantageously, this provides a particularly good sealing and facilitates the assembly of the cartridge 410. Preferably, the filament bundle 441 forming the liquid-conveying susceptor arrangement 440 is overmolded with the sealing rings 449 prior to assembling the cartridge 410.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein. In this context, therefore, a number A is understood as A ±5 percent of A. Within this context, a number A may be considered to include numerical values that are within general standard error for the measurement of the property that the number A modifies. The number A, in some instances as used in the appended claims, may deviate by the percentages enumerated above provided that the amount by which A deviates does not materially affect the basic and novel characteristic(s) of the claimed invention. Also, all ranges include the maximum and minimum points disclosed and include any intermediate ranges therein, which may or may not be specifically enumerated herein.

The invention claimed is:

1. A cartridge for a stick-shaped aerosol-generating article, the stick-shaped aerosol-generating article being for an inductively heating aerosol-generating device, the cartridge comprising:

a vaporization chamber at a distal end portion of the cartridge and being configured to vaporize aerosol-forming liquid therein;

a reservoir chamber proximal the vaporization chamber and being configured to store aerosol-forming liquid;

a liquid-conveying susceptor arrangement configured and arranged to convey aerosol-forming liquid from the reservoir chamber into the vaporization chamber and to be inductively heated with the inductively heating aerosol-generating device in order to vaporize aerosol-forming liquid within the vaporization chamber;

a vapor-conveying conduit providing a fluid communication for vaporized aerosol-forming liquid from the vaporization chamber to a region proximal the reservoir chamber;

a septum forming a common wall member of the vaporization chamber and the reservoir chamber, the septum comprising at least one filling hole for filling aerosol-forming liquid into the reservoir chamber via the vaporization chamber; and a plug-shaped distal end cap forming at least a distal end wall member of the vaporization chamber, wherein the plug-shaped distal end cap is non-integral with any wall member of the reservoir chamber, and wherein the plug-shaped distal end cap comprises at a proximal end at least one plug member sealingly closing the at least one filling hole in the septum.

2. The cartridge according to claim 1, wherein the plug-shaped distal end cap is inductively non-heatable.

3. The cartridge according to claim 1, wherein the vaporization chamber comprises at least one air inlet formed in the plug- shaped distal end cap, and wherein the at least one air inlet comprises an air vent hole through the plug-shaped distal end cap or an air vent groove formed in a surface of the plug-shaped distal end cap facing a wall member of the vaporization chamber other than the plug-shaped distal end cap.

4. The cartridge according to claim 3, wherein the wall member is a circumferential outer side wall member of the vaporization chamber.

5. The cartridge according to claim 1, wherein the plug-shaped distal end cap further comprises a plug body inserted into a circumferential outer side wall member of the vaporization chamber.

6. The cartridge according to claim 5, wherein the plug body comprises a circumferential collar providing a sealing fit of the plug-shaped distal end cap in the cartridge.

7. The cartridge according to claim 6, wherein the sealing fit is against a circumferential outer side wall member of the reservoir chamber.

8. The cartridge according to claim 1, wherein the plug-shaped distal end cap further comprises a cover plate.

9. The cartridge according to claim 1, wherein the plug-shaped distal end cap further comprises an insertion portion at least partially inserted in a circumferential outer side wall member of the vaporization chamber.

10. The cartridge according to claim 9, wherein the at least one plug member is arranged at a proximal end of the insertion portion.

11. The cartridge according to claim 1, wherein the plug-shaped distal end cap further comprises at least one supporting leg extending to the septum.

12. The cartridge according to claim 11, wherein the at least one supporting leg extends along an inner surface of a circumferential outer side wall member of the vaporization chamber.

13. The cartridge according to claim 11, wherein the at least one plug member is arranged at a proximal end of the at least one supporting leg.

14. The cartridge according to claim 1, wherein the plug-shaped distal end cap further comprises four supporting legs extending to the septum.

15. The cartridge according to claim 1, wherein the at least one plug member is made of a same material as other parts of the plug-shaped distal end cap.

16. The cartridge according to claim 1, wherein the at least one plug member is integral with other parts of the plug-shaped distal end cap.

17. The cartridge according to claim 1, wherein the at least one filling hole is arranged adjacent a through hole of the septum through which the vapor-conveying conduit passes or is supported in at a distal end portion.

18. The cartridge according to claim 1, wherein the plug-shaped distal end cap is mounted in the cartridge by press-fit or by snap-fit or by welding or by an adhesive bond.

19. A stick-shaped aerosol-generating article for an inductively heating aerosol-generating device, the stick-shaped aerosol-generating article comprising a cartridge according to claim 1 and a mouthpiece at a proximal end portion of the stick-shaped aerosol-generating article, wherein the vaporization chamber is arranged at a distal end portion of the stick-shaped aerosol-generating article.

* * * * *